US 7,175,570 B2

(12) United States Patent  (10) Patent No.: US 7,175,570 B2
Lull et al.  (45) Date of Patent: Feb. 13, 2007

(54) EXERCISE BICYCLE FRAME

(75) Inventors: Andrew P. Lull, Boulder, CO (US); William A. Baker, Longmont, CA (US)

(73) Assignee: Nautilus, Inc., Vancouver, WA (US)

( * ) Notice: Subject to any disclaimer, the term of this patent is extended or adjusted under 35 U.S.C. 154(b) by 254 days.

(21) Appl. No.: 10/093,325

(22) Filed: Mar. 6, 2002

(65) Prior Publication Data

US 2002/0155929 A1  Oct. 24, 2002

Related U.S. Application Data

(63) Continuation-in-part of application No. 09/803,630, filed on Mar. 9, 2001, which is a continuation-in-part of application No. 09/379,560, filed on Aug. 23, 1999, now Pat. No. 6,641,507, which is a continuation of application No. 08/919,695, filed on Aug. 28, 1997, now Pat. No. 5,961,424.

(60) Provisional application No. 60/038,726, filed on Feb. 18, 1997.

(51) Int. Cl.
 *A63B 21/00* (2006.01)
(52) U.S. Cl. ...................................................... 482/57
(58) Field of Classification Search ............ 482/51–52, 482/57–65
See application file for complete search history.

(56) References Cited

U.S. PATENT DOCUMENTS 562,198 A  6/1896 Robinson ..................... 482/52
588,166 A  8/1897 McCoy ....................... 74/551.1

(Continued)

FOREIGN PATENT DOCUMENTS

AT  132504  5/1949

(Continued)

OTHER PUBLICATIONS

Advertisement: aerobika; "Giugiaro Trebispin 'Safety'", Apr. 23, 1998, poor quality image.

(Continued)

*Primary Examiner*—Stephen R. Crow
(74) *Attorney, Agent, or Firm*—Dorsey & Whitney LLP

(57) ABSTRACT

An exercise bicycle including a frame, an adjustable seat structure, and an adjustable handlebar structure. One example of the frame includes a front fork, a down tube connected with the front fork, a seat tube, and a bottom frame member. The down tube has a first section that extends downwardly and rearwardly from a top portion of the front fork and has a section horizontal section connected with the seat tube. The front fork, down tube, seat tube, and bottom frame member define a five sided structure. The frame also includes a rear support brace connected with the seat tube and the bottom frame member in a triangular configuration. The seat structure has a seat post that is adjustably supported in the seat tube. The seat structure also has a horizontal seat rail and a cooperating seat collar that slides back and forth on the seat rail to allow fore and aft adjustment of a seat connected with the seat collar. The handlebar structure is adjustably supported in the a head tube, which is connected to the top of the front fork, and provides a plurality of gripping positions for a user.

33 Claims, 31 Drawing Sheets

U.S. PATENT DOCUMENTS

| | | | |
|---|---|---|---|
| 633,534 A | 9/1899 | Read | 280/261 |
| 635,082 A | 10/1899 | Stiles | 280/261 |
| 671,785 A | 4/1901 | Young et al. | 482/57 |
| 1,336,774 A | 4/1920 | Cooper | 482/57 |
| 1,507,554 A | 9/1924 | Cooper | 482/57 |
| 1,636,327 A | 7/1927 | Roe | 474/144 |
| 2,066,557 A | 1/1937 | Cox | 248/429 |
| 2,320,489 A | 6/1943 | Turner et al. | 272/73 |
| 2,446,363 A | 8/1948 | Daum | 192/48.6 |
| 2,603,486 A | 7/1952 | Hughes | 128/25 R |
| 3,062,204 A | 11/1962 | Stefano | 482/57 |
| 3,283,997 A | 11/1966 | Bambenek et al. | |
| 3,432,164 A | 3/1969 | Deeks | |
| 3,494,616 A | 2/1970 | Parsons | |
| 3,511,097 A | 5/1970 | Corwin | 482/57 |
| D218,338 S | 8/1970 | Dimick et al. | D34/5 |
| D220,024 S | 2/1971 | Fujiyoshi et al. | D90/8 |
| 3,578,800 A | 5/1971 | DiNepi | 272/73 |
| 3,596,921 A | 8/1971 | Bruckl | 273/80 B |
| 3,603,609 A | 9/1971 | Hott | |
| 3,623,582 A | 11/1971 | Giger et al. | 192/46 |
| 3,664,027 A | 5/1972 | Fritz et al. | 33/174 R |
| D225,070 S | 11/1972 | Proctor | D34/5 |
| D229,077 S | 11/1973 | Scalingi et al. | D34/5 K |
| 3,809,402 A | 5/1974 | Haines et al. | 273/73 C |
| 3,833,216 A | 9/1974 | Philbin | 272/73 |
| D233,160 S | 10/1974 | Jouk | D34/5 K |
| 3,854,561 A | 12/1974 | Conde | 192/48.92 |
| 3,861,715 A * | 1/1975 | Mendoza | 280/260 |
| D234,305 S | 2/1975 | Woods et al. | D34/5 K |
| 3,939,932 A | 2/1976 | Rosen | 180/33 C |
| 3,966,201 A | 6/1976 | Mester | 272/72 |
| 3,995,491 A | 12/1976 | Wolfla, II | 73/379 |
| D243,028 S | 1/1977 | Proctor | D34/5 K |
| D243,165 S | 1/1977 | Wheeler | D12/11 |
| 4,007,927 A | 2/1977 | Proctor | 272/73 |
| 4,150,851 A | 4/1979 | Cienfuegos | 297/195 |
| D251,747 S | 5/1979 | Valentine et al. | D21/194 |
| 4,188,030 A | 2/1980 | Hooper | 272/73 |
| D254,679 S | 4/1980 | Gustafsson | D21/194 |
| 4,220,232 A | 9/1980 | Fey et al. | 192/48.3 |
| D257,515 S | 11/1980 | Faux | D21/194 |
| 4,266,794 A | 5/1981 | Bals | 280/227 |
| 4,286,701 A | 9/1981 | MacDonald | 192/48.3 |
| 4,298,893 A | 11/1981 | Holmes | 272/73 |
| D262,302 S | 12/1981 | Disbrow et al. | D21/194 |
| 4,313,602 A | 2/1982 | Sullivan | 272/73 |
| 4,338,798 A | 7/1982 | Gilman | 464/23 |
| 4,371,185 A | 2/1983 | Bals | 280/227 |
| 4,436,097 A | 3/1984 | Cunningham | |
| 4,441,705 A | 4/1984 | Brown | |
| D275,589 S | 9/1984 | Gustafsson | D21/194 |
| D279,206 S | 6/1985 | Smith et al. | |
| D280,117 S | 8/1985 | Collins | D21/194 |
| D280,118 S | 8/1985 | Collins | D21/194 |
| 4,533,136 A | 8/1985 | Smith et al. | 272/73 |
| 4,555,109 A | 11/1985 | Hartmann | |
| 4,577,860 A | 3/1986 | Matias | 482/57 |
| D283,431 S | 4/1986 | Gustafsson | |
| 4,589,656 A | 5/1986 | Baldwin | |
| D284,596 S | 7/1986 | McNeil | D21/194 |
| D285,816 S | 9/1986 | Berntsson | |
| D285,953 S | 9/1986 | Gustafsson | D21/667 |
| 4,632,386 A | 12/1986 | Beech | 482/57 |
| 4,645,472 A | 2/1987 | Heidenreich | 464/48 |
| 4,657,244 A | 4/1987 | Ross | 272/73 |
| D289,782 S | 5/1987 | Szymski et al. | D21/194 |
| 4,671,396 A | 6/1987 | Kotamaki | 192/41 S |
| 4,673,177 A | 6/1987 | Szymski | 272/73 |
| D291,462 S | 8/1987 | Aalto | D21/194 |
| D291,713 S | 9/1987 | Kiiski | D21/667 |
| D292,225 S | 10/1987 | Breger | D21/667 |
| D292,304 S | 10/1987 | Ostrom | D21/194 |
| 4,705,269 A | 11/1987 | DeBoer et al. | 272/73 |
| 4,712,789 A | 12/1987 | Brilando | 272/73 |
| 4,712,790 A | 12/1987 | Szymski | 272/73 |
| D296,457 S | 6/1988 | Anitua | D21/667 |
| 4,757,988 A | 7/1988 | Szymski | 272/73 |
| 4,768,777 A | 9/1988 | Yang | 482/57 |
| 4,772,069 A | 9/1988 | Szymski | 297/195 |
| 4,775,145 A | 10/1988 | Tsuyama | |
| D299,732 S | 2/1989 | Gustafsson | D21/667 |
| 4,824,102 A | 4/1989 | Lo | 482/57 |
| 4,826,150 A | 5/1989 | Minoura | |
| 4,880,225 A | 11/1989 | Lucas et al. | 482/59 |
| 4,902,001 A | 2/1990 | Balbo | 272/73 |
| 4,915,374 A | 4/1990 | Watkins | 482/57 |
| 4,936,570 A | 6/1990 | Szymski et al. | 482/57 |
| 5,000,469 A | 3/1991 | Smith | 280/261 |
| 5,016,870 A | 5/1991 | Bulloch et al. | |
| 5,046,723 A * | 9/1991 | Szymski et al. | 482/57 |
| D323,805 S | 2/1992 | Giard, Jr. | D12/178 |
| D325,946 S | 5/1992 | Cesaroni et al. | |
| 5,145,477 A | 9/1992 | Han | 482/57 |
| D337,748 S | 7/1993 | Adams | D12/178 |
| 5,232,422 A | 8/1993 | Bishop, Jr. | 482/57 |
| D346,145 S | 4/1994 | Jeshurun et al. | D12/178 |
| 5,310,392 A | 5/1994 | Lo | |
| 5,319,994 A | 6/1994 | Miller | 74/551.8 |
| 5,319,995 A | 6/1994 | Huang | 74/551.8 |
| 5,336,147 A | 8/1994 | Sweeney, III | 482/57 |
| 5,423,728 A * | 6/1995 | Goldberg | 482/57 |
| 5,460,396 A | 10/1995 | Sutter et al. | |
| 5,472,396 A | 12/1995 | Brazaitis | 482/57 |
| D368,678 S | 4/1996 | Wilcox et al. | D12/111 |
| D372,284 S | 7/1996 | Wang et al. | D21/667 |
| D380,796 S | 7/1997 | Wang et al. | D21/667 |
| D382,924 S | 8/1997 | Wu | D21/667 |
| D382,925 S | 8/1997 | Wu | D21/667 |
| 5,660,085 A | 8/1997 | Tamplin | 74/551.3 |
| 5,685,553 A | 11/1997 | Wilcox et al. | 280/283 |
| 5,722,916 A | 3/1998 | Goldberg | 482/57 |
| 5,758,548 A | 6/1998 | Smith | 74/551.1 |
| 5,816,372 A | 10/1998 | Carlson et al. | 188/267.2 |
| 5,833,575 A | 11/1998 | Holslag | 482/51 |
| D407,767 S | 4/1999 | Chang | D21/663 |
| D415,083 S | 10/1999 | DeRoche | D12/178 |
| 5,961,424 A | 10/1999 | Warner et al. | 482/63 |
| 6,146,313 A | 11/2000 | Whan-Tong et al. | 482/51 |
| 6,155,958 A | 12/2000 | Goldberg | 482/57 |
| D473,273 S | 4/2003 | Crawford et al. | D21/694 |
| D474,252 S | 5/2003 | Lull et al. | D21/697 |
| 6,557,679 B1 | 5/2003 | Warner et al. | 192/17 D |
| 6,561,952 B2 | 5/2003 | Wu | 482/3 |
| 6,564,673 B1 | 5/2003 | Kilmer | 74/551.8 |
| 6,612,970 B2 | 9/2003 | Forcillo | 482/57 |
| 6,641,507 B1 | 11/2003 | Warner et al. | 482/63 |
| 6,669,603 B1 | 12/2003 | Forcillo | |
| 6,913,560 B2 | 7/2005 | Ryan et al. | |
| 2002/0077221 A1 | 6/2002 | Dalebout et al. | |
| 2002/0151414 A1 | 10/2002 | Baker | |
| 2003/0171191 A1 | 9/2003 | Crawford et al. | |

FOREIGN PATENT DOCUMENTS

| | | |
|---|---|---|
| AT | 209202 | 5/1960 |
| CH | 7700 | 12/1893 |
| DE | 517774 | 2/1931 |
| DE | 9127 | 2/1955 |
| DE | 24365494 | 2/1976 |
| FR | 328506 | 7/1903 |
| FR | 779363 | 1/1935 |
| FR | 800679 | 5/1936 |
| FR | 89009 | 4/1967 |

| | | |
|---|---:|---|
| FR | 89347 | 5/1967 |
| FR | 2003598 | 11/1969 |
| FR | 2108579 | 5/1972 |
| FR | 2500311 | 8/1982 |
| GB | 4221 | 2/1902 |
| GB | 1469363 | 4/1977 |
| TW | 304432 | 5/1997 |

OTHER PUBLICATIONS

Picture: Reebok Studio Cycle, date unknown, poor quality image.
Brochure: Nowadays ApS; "Spinning, Total Conditioning for the Body and the Soul", date unknown, poor quality image.
Brochure: Schwinn Cycling & Fitness Inc., "Johnny G. Spinner, by Schwinn, Go Fast standing still", 4 pages, 1995, poor quality image.
Catalog: "Schwinn® Fitness Equipment", available as early as 1985, poor quality image.
Catalog: "Schwinn® Fitness Catalog", available as early as 1987.
Catalog: "Schwinn '88 Lighweight Bicycles", available as early as 1988.
Catalog: "1990 Schwinn Full-Line Fitness Catalog", 1990.
Catalog: "Schwinn Fitness"; available as early as 1991.
Catalog: "The 1993 Schwinn Fitness Line", available as early as 1993.
Catalog: "93 New Bikes. New Thinking.", available as early as 1993.
Catalog: "Schwinn Fitness Equipment a change of shape", available as early as 1995.
Catalog: "Discover the Power Inside™, Schwinn 1995 fitness equipment", available as early as 1995.
Catalog: "LeMond™ RevMaster™", available as early as 2000.
Catalog: "Schwinn Fitness Equipment", date unknown, poor quality images.
Johnny G. Spinning© Instructor Manual, (Copyright 1995).
Catalog: *Schwinn® Fitness, Harness the Force of Nature and You Possess the Strength of Confidence* brochure 30 pages, 1996-1997.

* cited by examiner

EXERCISE BICYCLE FRAME

CROSS REFERENCE TO RELATED APPLICATIONS

This application is a continuation-in-part of application Ser. No. 09/803,630 entitled "Free Wheel Clutch Mechanism for Bicycle Drive Train," filed Mar. 9, 2001; which is a continuation-in-part application of application Ser. No. 09/379,560, entitled "Free Wheel Clutch Mechanism for Bicycle Drive Train" filed Aug. 23, 1999 now U.S. Pat. No. 6,641,507; which is a continuation of application Ser. No. 08/919,695, entitled "Free Wheel Clutch Mechanism for Bicycle Drive Train" filed Aug. 28, 1997, now U.S. Pat. No. 5,961,424; which is a non-provisional utility application claiming priority to provisional Application No. 60/038,726 entitled "Free Wheel Clutch Mechanism for Bicycle Drive Train," filed Feb. 18, 1997, which are hereby incorporated by reference in their entirety.

United States provisional patent application entitled "Exercise Bicycle Handlebar" filed on Mar. 6, 2002, with application Ser. No. 60/362,580, and United States patent application entitled "Exercise Bicycle" filed on Jan. 17, 2002, with application Ser. No. 10/051,602, are hereby incorporated by reference in their entirety.

FIELD OF THE INVENTION

This invention relates generally to free wheeling devices, and more particularly to a free wheel clutch mechanism useful with crank operated exercise bicycles employing an inertia flywheel.

BACKGROUND

The benefit of exercising on a direct drive exercise bicycle is well known. Direct drive exercise bicycles typically utilize a high-inertia flywheel driven by a fixed-gear drive train. The flywheel is driven by the rider up to relatively high revolutions per minute (rpm). Because of the direct drive feature, the drive train must rotate at a fixed ratio of rpm as compared to the flywheel based on the gear ratio. One benefit of the direct drive exercise bicycle is that the direct drive gear train provides "pedal-through assistance" for the rider. The "pedal-through" feature assists the rider by pushing the pedal through the top and bottom dead center pedal positions to help make the transition smooth and efficient. Other benefits are derived from the direct drive interaction between the inertia flywheel and the crank arms to which the rider's feet are attached. The inertia flywheel provides a smooth, non-jerky pedaling rhythm which provides an efficient and rigorous exercise for the rider, especially at relatively high rpms, such as 60 to 100 rpm.

In the application of this invention to an inertia flywheel exercise bicycle, positive drive is required to rotate the inertia wheel in order to overcome regulated retardation torque applied by brake means used to provide resistance against which the rider/operator works. The inertia wheel provides means for continued drive train (wheel to crank to leg) movements during those periods when the crank is in top dead center or bottom dead center positions, where the rider's legs are somewhat weaker in providing rotary motion to the activating crank arms. The flywheel affords smooth and steady operation for the rider.

The direct drive relationship between the flywheel and the drive train is also a drawback of exercising on this type of bicycle. The direct drive relationship is inconvenient when the rider wishes to quickly stop the pedals, or loses the pedaling rhythm required to keep up with the rotating flywheel. In the usual flywheel exerciser employing such a direct drive relationship, it is necessary for the rider/operator to gradually decrease his cranking rate in order to slow down the inertia wheel. The rider cannot suddenly stop pedaling inasmuch as the inertia flywheel continues to drive the crank arms.

Of similar importance is the desirability of providing pedal assist to the rider/operator's legs when cranking at a speed slower than that necessary to positively drive the flywheel, and providing for a gradual reengagement and lockup between the pedal actuated drive shaft and the free wheeling flywheel in order to avoid abrupt impact when reengaging the moving flywheel.

It is with these issues in mind that the present invention was developed.

SUMMARY OF THE INVENTION

The present invention in general terms concerns a clutch mechanism for use on an exercise bicycle, and consequently, the present invention recognizes that it is desirable to have a free wheeling mechanism for an exerciser of the inertia flywheel type which provides means for selectively disengaging the flywheel from the drive means. The clutch mechanism allows for the beneficial direct-drive connection between the drive train and the flywheel, and also allows the drive train and flywheel to move independently from one another, or "break free", when a sufficient force is applied to the drive train or the flywheel.

In general, the invention is an exercise bicycle including a frame having a seat and handlebars, a high-inertia flywheel having a hub at a center of rotation, the flywheel being rotatably supported on the frame at the hub, and a drive train including a drive sprocket, a crank arm attached to and extending from the drive sprocket, and a pedal attached to the crank arm, the drive train being rotatably supported by the frame. The drive train also includes a slave sprocket fixed to the flywheel at the hub, with the drive and slave sprockets connected in a direct-drive relationship, the drive train driveable in a forward and rearward directions to cause the flywheel to rotate. A clutch mechanism is positioned in engagement with the slave sprocket and the hub to create a frictional engagement between the sprocket and the hub, and to establish a break-free force. When the drive train is actuated in the forward direction, the slave sprocket and the hub move together under a mechanical engagement, and when the drive train is actuated in the rearward direction under the influence of a force greater than the break-free force, the clutch mechanism slips between the slave sprocket and the hub, allowing the slave sprocket and the flywheel to move independently of one another. There is no mechanical engagement between the sprocket and the hub in the rearward direction as there is in the forward direction, established by the one-way bearing.

More specifically, the slave sprocket defines a sprocket collar mounted on the hub and also includes an engagement collar. A one-way bearing is mounted between the sprocket collar and the hub to allow the sprocket collar to drive the hub when the sprocket collar is driven in a forward direction, and to allow the sprocket collar to spin independently of the hub when the sprocket collar is driven in the rearward direction. An engagement flange fixedly mounted on the hub corresponds to the engagement collar, and compression means are mounted on the flywheel to bias the flange and the collar towards one another. A clutch material member is positioned between the engagement flange and the collar, and is clamped therebetween by the compression means to cause the engagement flange to move in conjunction with the sprocket collar. The engagement creates a break-free force required to cause the sprocket collar to move independently of the engagement flange. When the drive train is actuated in the forward direction, the sprocket collar and the engagement flange move together, and when the drive train is actuated in the rearward direction and overcomes the break-free force, the engagement flange slips with respect to the collar, allowing the sprocket collar and the flywheel to move independently of one another.

In another embodiment, the slave sprocket defines a sprocket collar mounted on the hub and defines an inner and outer engagement collars. A one-way bearing is mounted between the sprocket collar and the hub to allow the sprocket collar to drive the hub when the sprocket collar is driven in a forward direction, and to allow the sprocket collar to spin freely on the hub when the sprocket collar is driven in the rearward direction. An inner engagement flange is fixedly mounted on the hub corresponding to the inner engagement collar, and an outer engagement flange is fixedly mounted on the hub corresponding to the outer engagement collar. Compression means are mounted on the flywheel to bias the inner flange and the inner collar towards one another, and to bias the outer flange and the outer collar towards one another. A clutch material member is positioned between the outer engagement flange and the outer collar, and between the inner engagement flange and the inner collar, and clamped therebetween by the compression means to cause the inner and outer engagement flanges to move in conjunction with the sprocket collar. The engagement creates a break-free force required to cause the sprocket collar to move independently of inner and outer engagement flanges. When the drive train is actuated in the forward direction, the sprocket collar and the inner and outer flanges move together, and when the drive train is actuated in the rearward direction and overcomes the break-free force, the inner and outer engagement flanges slip with respect to the inner and outer collars, allowing the sprocket collar and the flywheel to move independently of one another. There are other embodiments of the invention disclosed which perform the same function with very similar structure.

Also, the invention includes an exercise bicycle frame for use with the clutch mechanism. The frame includes a front support, a rear support, and a brace member extending between the front and rear ground supports. In addition, front forks are included that have a top end and a bottom end, and are attached at the bottom end to the front ground support. The front forks rotatably support a high-inertia flywheel. A rear post is included that has a top member and a bottom member, the top member attaching to the bottom member in a rear offset overlapping manner, the rear post defining a top end and a bottom end. The rear post is attached at the bottom end to the brace member. An articulated beam is attached to and extends from the top end of the front forks downwardly and rearwardly to a midpoint between the front forks and the rear post, then extends horizontally to the rear post at the intersection of the top and bottom members of the rear post. A rear truss extends from the top member of the rear post to the rear support. A handlebar is attached at the top end of the front forks, and a seat is attached at the top end of the rear post. A front area is defined by the front forks, articulated beam, rear post and brace member forming a five-sided polygon, and a rear area is defined by the rear post, rear truss, and brace member forming a five-sided polygon.

In one example of the exercise bicycle frame according to the present invention, the frame includes a front fork having a head tube and at least one fork leg. The frame further includes a seat tube having a top section and a bottom section. A top tube extends between the front fork and the seat tube, and the top tube has a first portion angularly offset from a second portion. A rear support brace is connected with the seat tube. A bottom frame member extends between the rear support brace, the seat tube, and the front fork. The front fork, the first portion of down tube, the second portion of the down tube, the seat tube, and the bottom frame member define a five-sided frame section.

In one aspect of the frame according to the invention, the top section of the seat tube is offset from the bottom portion of the seat tube. The bottom section of the seat tube includes a bottom bracket for supporting a pedal assembly.

In another aspect of the frame according to the invention, a gusset is connected with the bottom section of the seat tube. The gusset includes a bottom bracket for supporting a pedal assembly. The gusset has a first side wall and a second side wall defining a substantially U-shaped cross section. The first side wall and the second side wall are connected with the bottom portion of the seat tube. The first side wall and the second side wall are also connected with the second portion of the top tube and the bottom frame member.

In another aspect of the frame, the first portion of the top tube is connected with the head tube. The first portion of the top tube extends downwardly and rearwardly from the head tube. The second portion of the top tube is substantially horizontal, and the second portion of the top tube is substantially parallel with the bottom frame member. The top section of the seat tube defines a seat aperture adapted to receive a seat assembly. The head tube defines a handlebar aperture adapted to receive a handlebar assembly.

In another alternative of the frame invention, an exercise bicycle frame comprising a five side frame structure includes means for supporting a seat assembly, means for supporting a handlebar assembly, upper means for attaching the means for supporting the seat assembly with the means for supporting a handlebar assembly, the upper means having a first length and a second angularly offset length, and lower means for attaching the means for supporting the seat assembly with the means for supporting a handlebar assembly. The five sided frame structure further includes gusset means for supporting a pedal assembly.

Another embodiment of the present invention is a seat assembly for use with exercise equipment. The seat assembly includes a rectangular tube seat rail defining a top surface having an upwardly extending seat rail stop, the seat rail further defining a bottom surface. A rectangular tube seat post is connected with the bottom surface of the seat rail. The seat assembly also includes a seat slide collar defining a rectangular aperture adapted to engage the rectangular seat tube rail. The seat slide collar further defines a second top surface and a second bottom surface, the second top surface defining a channel adapted to cooperate with the seat rail stop to impeded the seat collar from rearwardly disengaging the seat rail, the second bottom surface defining a second channel adapted to cooperate with the seat post to provide extended forward adjustment positions. A second seat post is connected with the second top surface of the seat slide collar, the second seat post adapted to support a seat. The seat slide collar may be adjusted along the seat rail from between the seat rail stop and the channel and the rectangular seat post and the second channel.

In one embodiment of the seat assembly invention, the bottom surface of the seat rail defines a plurality of apertures. A pop pin is connected with the second bottom surface of the seat slide collar and the pop pin is adapted to engage one of the plurality of apertures. The seat rail further defines a front portion and a rear portion and the rectangular seat post is connected with the bottom surface of the seat rail proximate the front portion of the seat rail.

Other aspects, features and details of the present invention can be more completely understood by reference to the following detailed description in conjunction with the drawings, and from the appended claims.

DETAILED DESCRIPTION OF THE PREFERRED EMBODIMENT

In light of the above items, a free wheel clutch mechanism 40 has been developed for use on direct-drive exercise bicycles 42 utilizing an inertia flywheel 44 (FIGS. 1–4). While the present invention is described below associated with an exercise bicycle, it is contemplated that it could be used on normal bicycles or other exercise equipment, including magnetic resistive bicycles, air-resistance bicycles and other non-bicycle exercisers (such as upper body exercisers), each having rotary-driven mechanisms (wheels, etc.), in the proper circumstances. The free wheel clutch mechanism works in a direct-drive manner when the rider pedals the bicycle in the forward direction (counter-clockwise in FIGS. 1 and 2, clockwise in FIG. 3), but has a release, or free wheel, characteristic when the rider applies a required force on the pedal (or to the drive train somewhere) opposite or against the forward pedaling direction. Upon application of the appropriate opposite force ("break free force threshold"), the drive train free-wheels to allow the pedals to turn in the opposite direction with respect to, or more slowly than, the rotation of the flywheel. The rider can then either simply drive the pedals at a relatively lower rpm than the normal gear ratio to the flywheel, stop the pedals, or can rotate the pedals backwards.

The opposite force required to be applied to the pedals to cause the free wheeling action can be adjusted based on the design of the free wheel clutch mechanism, and is typically between 0.00 and 100 pounds, preferably 55 pounds at the pedals, depending on the application. The break free force threshold is based on the static frictional engagement between the clutch material and the clutch plates which the clutch material is clamped between, as well as the mechanical advantage provided through the drive train. The clutch plates, as defined below, are on different members that in normal circumstances are to rotate together. The friction force between the clutch material and the clutch plates facilitates this relationship. At a certain point (the break free force threshold), the opposing clutch plates overcome the static frictional force and spin at different speeds (r.p.m.'s) in the same direction, or in the opposite direction. The surface area of the clutch plates and the clutch plate material, the material property of the clutch plates and the clutch material, and the force at which the clutch plates clamp the clutch material are all factors that can be specifically designed to affect the break free force threshold. The break free force (as measured at the pedal) is affected also by the gear ratio and the length of the crank-arms.

Figure 3:
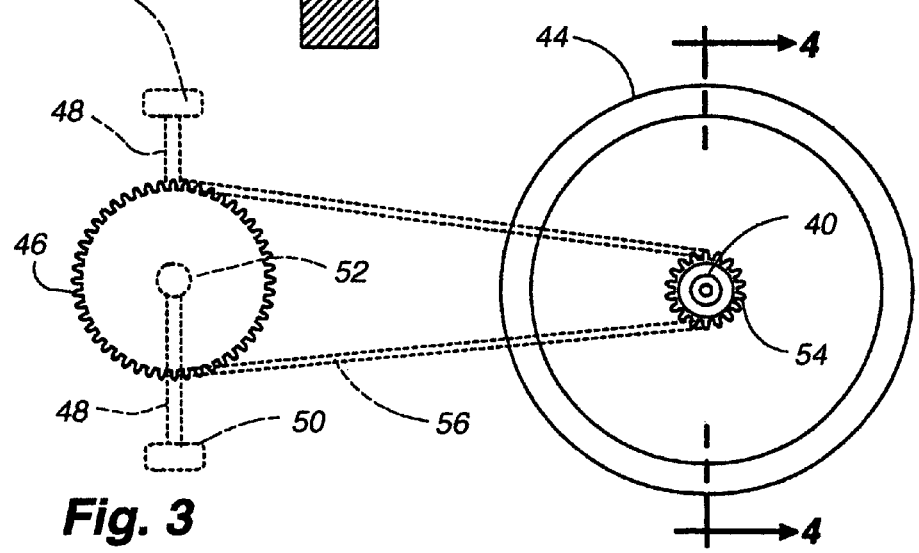
FIG. 3 is a schematic representation of the drive train of the exercise bicycle shown in FIG. 1.

The free wheel clutch mechanism 40 is integral to the drive train of the exercise bicycle. The drive or gear train includes the drive sprocket 46, the crank arms 48 and associated pedals 50 attached to the drive sprocket, the drive axle assembly 52, the slave sprocket 54, and the chain or belt 56 that interconnects the drive and slave sprockets, as shown in FIG. 3. Typically, the drive sprocket is rigidly mounted to one of the crank arms, and each crank arm is removably mounted to the drive axle assembly. The drive axle assembly is positioned in the hub on the frame to allow rotating movement, in either direction of the crank arms.

Figure 4:
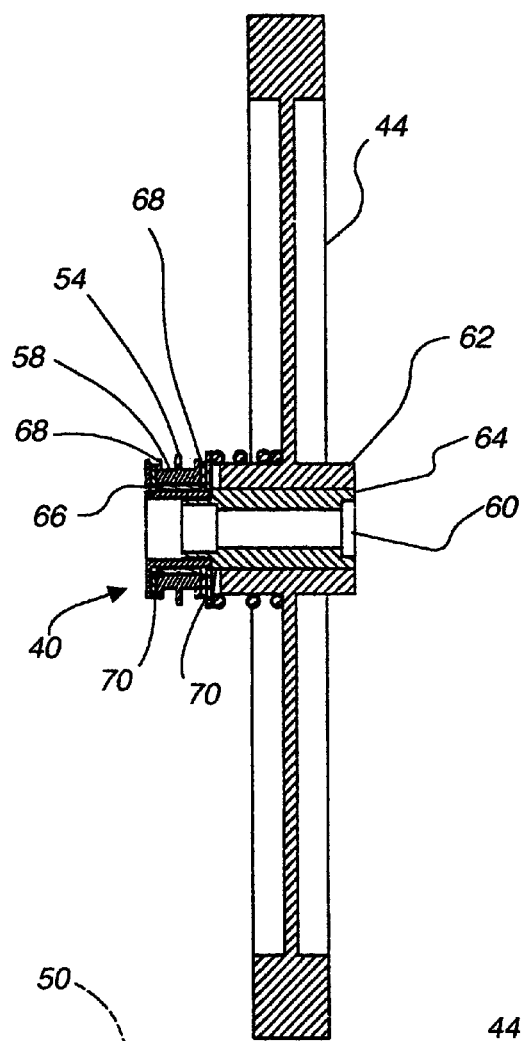
FIG. 4 is a section taken along line 4—4 of FIG. 3.

As shown in FIG. 4, the free wheel clutch mechanism 40 includes a sprocket collar 58 rotatably mounted on a slave axle assembly 60. The slave sprocket 54 is attached to the flywheel 44 adjacent to the hub 62. The slave axle assembly is mounted in the hub, and attaches to the frame to allow the flywheel to rotate with respect to the frame, under the force of the drive train through the movement of the slave axle assembly. The slave axle assembly is actually mounted in the hub, and includes an axle housing. Typically, the slave sprocket is mounted on the axle housing.

The free wheel clutch mechanism can be mounted in association with the drive sprocket, cranks and drive axle assembly, or can be mounted in association with the slave sprocket, slave axle assembly and flywheel. The placement of the free wheel clutch mechanism is a matter of choice dependent on the particular implementation. The only difference between the two positions of the free wheel clutch mechanism is that when mounted in association with the slave sprocket, the actuation of the free wheel clutch mechanism affects the movement of the chain and drive sprocket (slow down, stop or reverse). When the free wheel clutch mechanism is mounted in association with the drive sprocket, the actuation of the free wheel clutch mechanism allows the pedals and cranks to be slowed down, stopped, or reversed while the drive sprocket, chain and slave sprocket and flywheel continue to rotate. As described herein, the free wheel clutch mechanism is mounted in association with the slave sprocket.

Figure 5B:
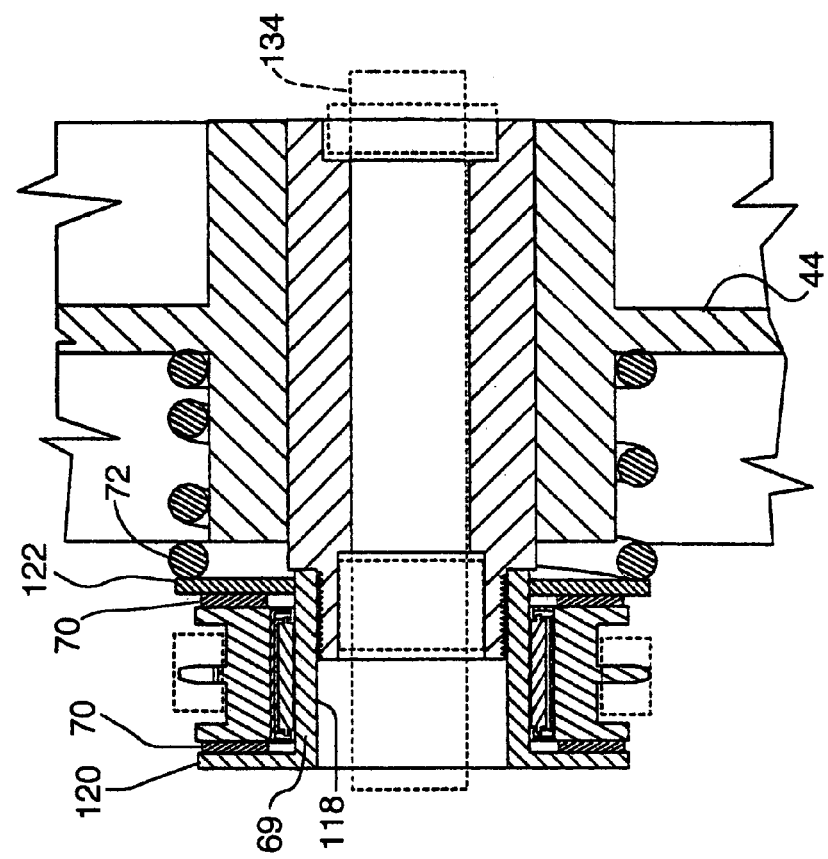
FIG. 5B is a representative section similar to FIG. 5A showing the effects of worn clutch material.
Figure 5A:
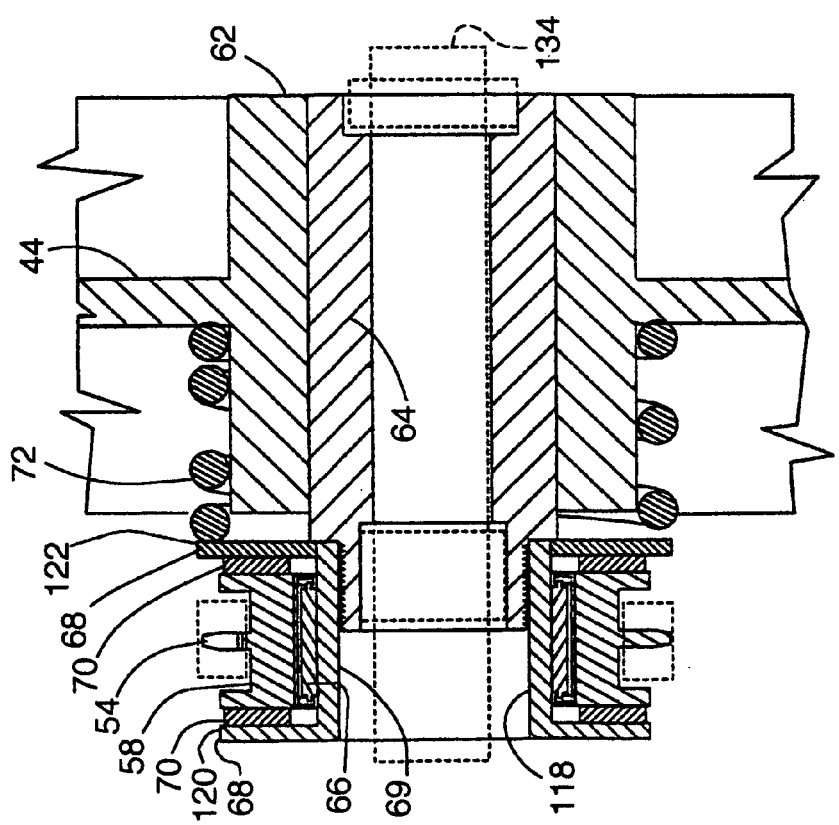
FIG. 5A is a section taken along line 5A—5A of FIG. 2.

More specifically as shown in FIGS. 4 and 5A, the free wheel clutch mechanism includes a sprocket collar 58 (in this case a "slave" sprocket collar) that is mounted in a one-way drive relationship with the axle housing 64 such that the rotation of the slave sprocket collar in one direction directly drives the axle housing, and the rotation of the slave sprocket collar in the reverse direction does not drive the axle housing (allows "free wheeling"). This free wheeling relationship is established by one-way bearings 66 or a ratchet and pawl structure used between the slave sprocket collar and the axle housing.

The free wheeling motion of the slave sprocket collar 58 with respect to the axle housing 64 (and hence hub 62 and flywheel 44) is tempered, or reduced, by clutch plates 68 and clutch or braking material 70 acting upon the slave sprocket collar. A clutch plate collar 69 is secured to the axle housing 64 to fixedly position one end of the free wheel clutch mechanism 40. The clutch plates 68 are rigidly mounted to turn with the axle housing (and hence the hub and flywheel), and are forced into contact with the sprocket collar 58 by a biasing means, such as a spring member 72. The braking material 70 is positioned between the sprocket collar and the clutch plates to provide a frictional interface between the two. The braking material can be mounted to either the sprocket collar, the clutch plates, or can be free-floating. The area of contact between the clutch plate and the sprocket collar (through the braking material) in combination with the compression force applied by the biasing means 72, creates the "break free" force required to be applied through the sprocket collar to allow the sprocket collar to "free wheel" on the axle housing. If the applied force is not sufficient to overcome the "break free" force, then the sprocket collar is not able to free wheel on the axle housing.

The free wheeling clutch mechanism is self-adjusting under the bias force to accommodate for the reduction in thickness of the braking material 70 wearing out through use. The clutch plates 68 "float" on the axle housing to adjust and maintain contact with the sprocket collar as the braking material becomes thinner.

Particular embodiments of the free wheeling clutch mechanism are described in more detail below.

Figure 1:
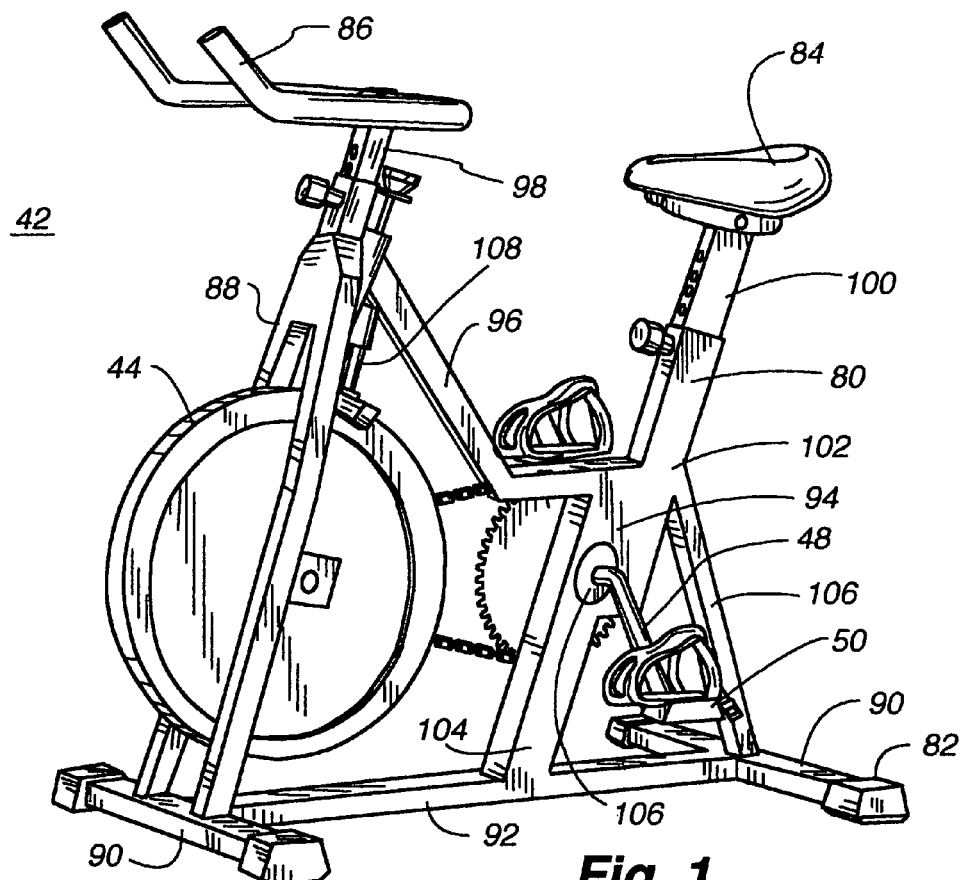
FIG. 1 is a perspective view of an exercise bicycle incorporating the clutch mechanism of the present invention.

An exercise bicycle 42 incorporating the present invention is shown in FIG. 1. The bicycle includes a frame 80 supported on a support surface by ground engagement members 82, an adjustable seat 84, adjustable handlebars 86, a flywheel 44 rotatably positioned between a pair of front forks 88 of the frame, and a gear train 54 attached to the frame adjacent to and below the seat.

The frame 80, as shown in FIG. 1, includes front and rear ground supports 90 attached by a horizontal frame brace member 92 extending there between, front forks 88, and a rear post 94. The front forks and rear post are attached by an articulated beam 96 sloping from the top of the front forks down to approximately midway between the front forks and the rear post, at which point the articulated beam extends horizontally rearwardly to engage the rear post. The articulated beam thus includes two members connected at an angle to one another, and extends between the top of the forks to the approximate midpoint of the rear post.

An aperture is formed at the top of the forks to receive a handlebar post 98, the handlebar post being vertically adjustable in the top of the forks by a pop-pin structure, as is known in the industry. Handlebars are attached to the top of the handlebar post in any known manner for use by the rider. An aperture is formed in the top of the rear post for receiving a seat post 100. The seat post is vertically adjustable in the rear post by a pop-pin structure, as is well known in the art. The seat can be forwardly and rearwardly adjusted on the seat post, such as by the mechanism disclosed in U.S. Pat. No. 4,772,069 to Szymski, incorporated herein by reference, in addition to being vertically adjustable.

The rear post 94 includes a top member 102 and a bottom member 104. The top member 102 is attached to extend from the rear side of the bottom member 104, and extends beyond the top of the bottom member 104 in a rear-offset overlapping manner. The articulated beam 96 is affixed to the rear post 94 at the top of the bottom member 104 and the front side of the top member 102. This attachment of the articulated beam to the rear post forms a strong structural connection.

The crank arms 48 for each of the pedals 50 are attached to a hub 106 which is supported by the rear post at a location along the height of the rear post where the bottom and top members of the rear post coextend. The rear post 94 attaches to the horizontal frame member 92 about midway between the front and rear ground support members 90. A rear truss 107 extends at an angle from the rear post 94 down to the rear ground support member 90 for added strength. The frame is constructed of rectangular or hollow cylindrical steel tubing, as is known in the art. Rectangular tubing is preferred.

The front area defined by the forks 88, articulated beam 96, rear post 94, and horizontal frame member 92 is a five-sided polygon. The rear area defined by the rear post 94, rear truss 107 and horizontal frame member 92 is also a five-sided polygon. A friction break 108 is mounted adjacent to the top of the front forks to selectively engage the opposing outer rims of the flywheel 44 to provide an additional friction load against which the rider must work in exercising on the exercise bicycle. This frame design, to the geometry of the frame structure, is very strong and durable, and is capable of withstanding the rigors of frequent use. The portion of the frame that supports the crank arms and chain ring is especially strong and durable in this design as a result of the overlapped construction of the rear post 94.

Figure 2:
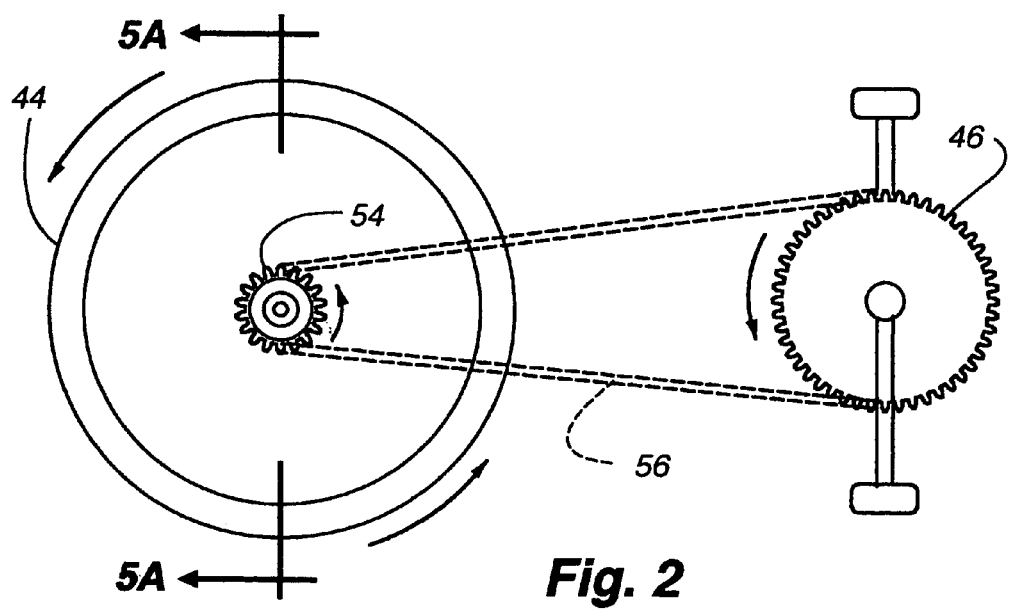
FIG. 2 is a schematic representation of the drive train of the exercise bicycle shown in FIG. 1.

As shown in FIGS. 1, 2 and 3, the drive or gear train (as described above) includes a drive sprocket 46 rotatably mounted on the frame, crank arms 48 and associated pedals 50 attached to the drive sprocket for driving the drive sprocket, a free wheel clutch assembly 40, a slave sprocket 54 attached on the flywheel 44, and a chain 56 connecting the drive sprocket to the slave sprocket, and to the free wheel clutch assembly. The chain could be replaced by a belt with accommodating modifications made to the drive and slave sprockets, with no adverse affect on the operation of the free-wheeling clutch mechanism of the present invention.

As with a standard direct drive exercise bicycle, the rider pedals the exercise bicycle using the crank arms and pedals, to drive the drive sprocket 46. The chain 56, engaged between the drive sprocket and slave sprocket 54, causes the flywheel 44 to rotate at the given rpms based on the gear ratio between the drive sprocket and the slave sprocket.

The free wheel clutch mechanism 40 engages the flywheel, as is described below, to allow the transfer of rotational movement from the slave sprocket 54 to the flywheel 44 in a direct-drive relationship when driven in the forward direction. Normal pedaling circumstances include the use of the exercise bicycle during an organized exercise class or individually, and include starting at 0.00 rpms and increasing and decreasing the rpms as is required or desired for certain exercise programs, whether the rider is standing, sitting or alternating during use. The free wheel clutch mechanism 40 of the present invention maintains the "pedal-through" benefit of standard direct drive exercise bicycles. The pedal-through benefit helps the rider pedal continuously and smoothly through the top and bottom pedal positions where riders typically are weakest.

The free wheel clutch mechanism 40 converts the direct drive relationship between the pedal revolutions and the flywheel revolutions to a "free wheel" relationship to allow the pedals 50 to be stopped, reversed in direction, or rotated more slowly than the flywheel 44, when a sufficient force is applied in the reverse direction to either of the pedals or anywhere on the drive train (where the clutch mechanism is positioned on the inertia wheel). Examples of the application of an opposite force include, but are not limited to, the intentional application of the reverse force by the rider while pedaling, for instance due to fatigue, or the contact of the pedal on the rider's lower leg when a foot is accidentally released from the pedal.

As shown in FIGS. 4, 5A, 5B, 6 and 7, the free wheel clutch mechanism 40 mounts on the slave axle assembly 60 adjacent to the hub 62 of the flywheel 44. A cylindrical slave axle housing 64 is press-fit into a cylindrical axial bore formed through the hub 62 of the flywheel. The end of the axle housing extending from the hub is externally threaded to receive the clutch plate collar 69.

In the description below, the terms "inside" and "inner" refer to the end closest to the flywheel 44, and the terms "outside" and "outer" refer to the end farthest from the flywheel. The clutch plate collar 69 includes a hollow cylindrical main body 118 with internal threads at one end for engagement with the external threads on the outer end of the axle housing 64. The clutch plate collar 69 has an outer radially extending engagement flange 120 attached to the outside end of the cylindrical main body 118, and an inner radially extending engagement flange 122 moveably attached to the inside end of the cylindrical main body.

Figure 7:
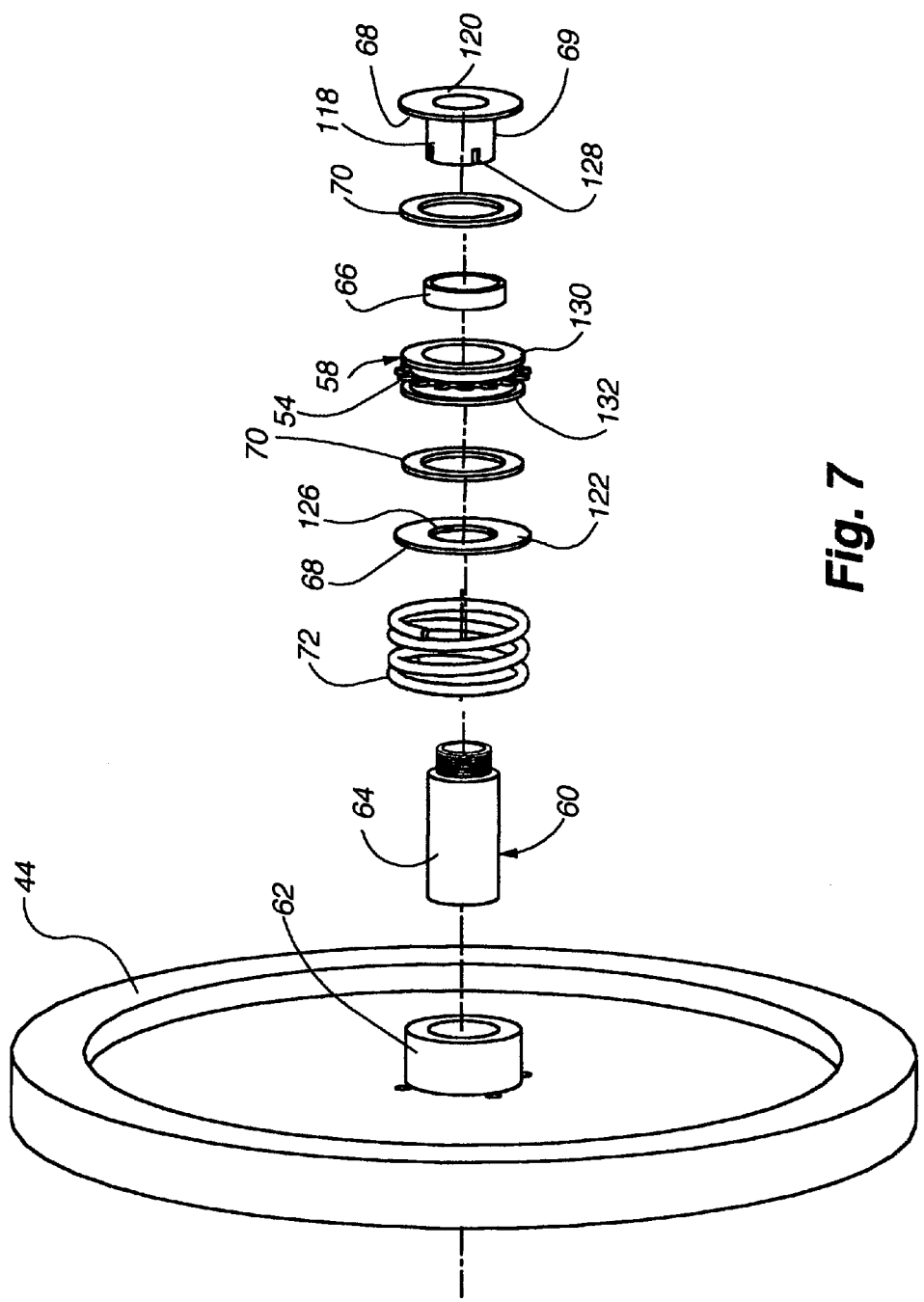
FIG. 7 is an exploded view of the flywheel of FIG. 6.
Figure 8:
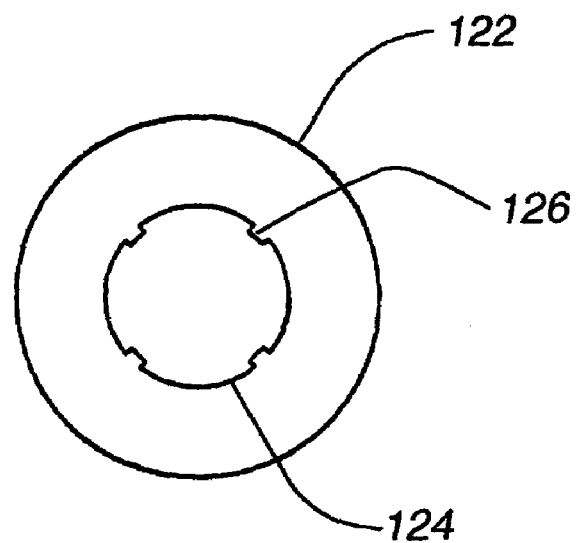
FIGS. 8 and 9 are elevation and perspective views, respectively, of a portion of the clutch mechanism.
Figure 9:
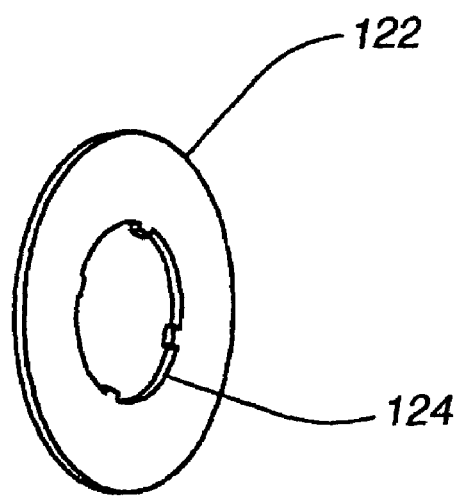
Figure 10:
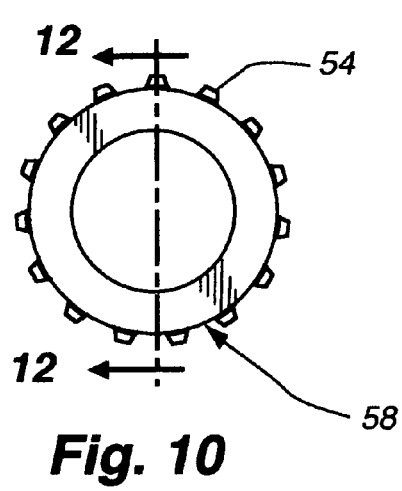
FIG. 10 is a side view of the sprocket collar member of the clutch mechanism of the present invention.
Figure 11:
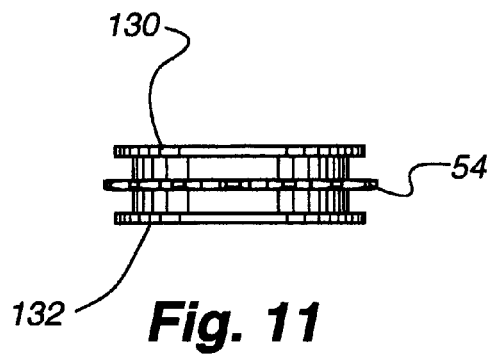
FIG. 11 is a top view of the sprocket collar shown in FIG. 10.
Figure 12:
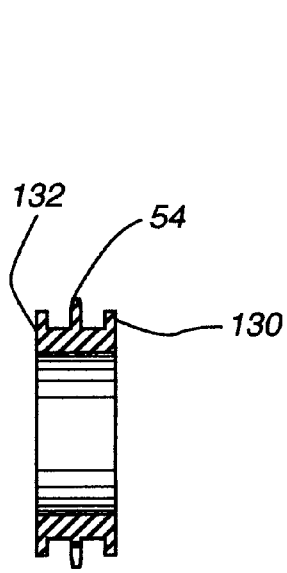
FIG. 12 is a section taken along line 12—12 of FIG. 10.
Figure 13:
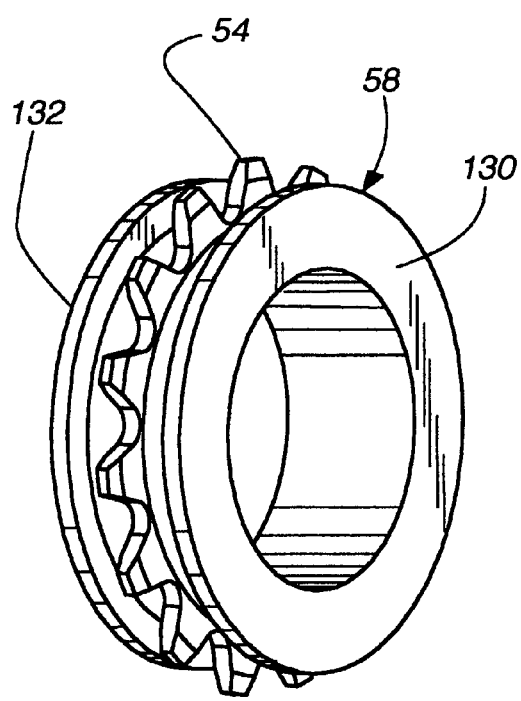
FIG. 13 is an enlarged front perspective view of the sprocket collar of FIG. 10.
Figure 14:
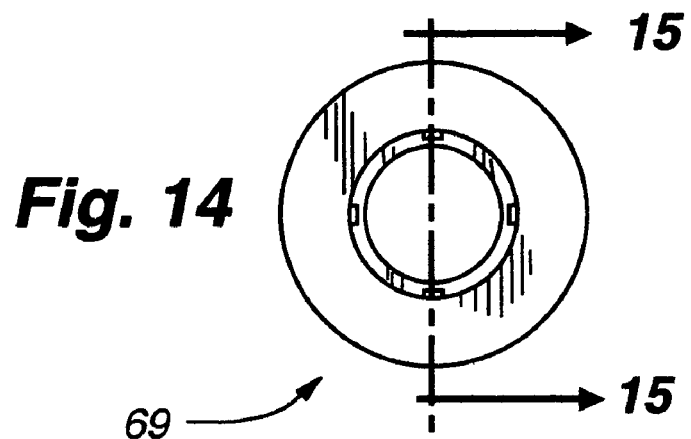
FIG. 14 is a side view of the clutch plate collar member of the clutch mechanism of the present invention.
Figure 15:
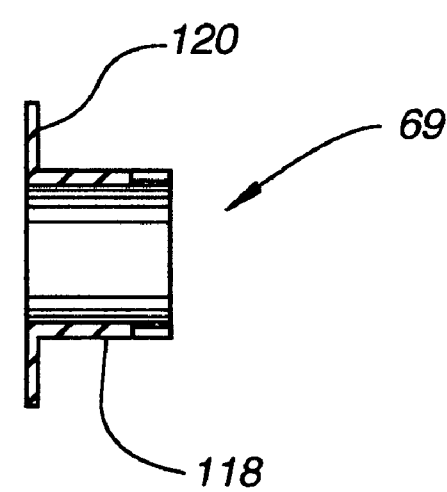
FIG. 15 is a section taken along line 15—15 of FIG. 14.
Figure 16:
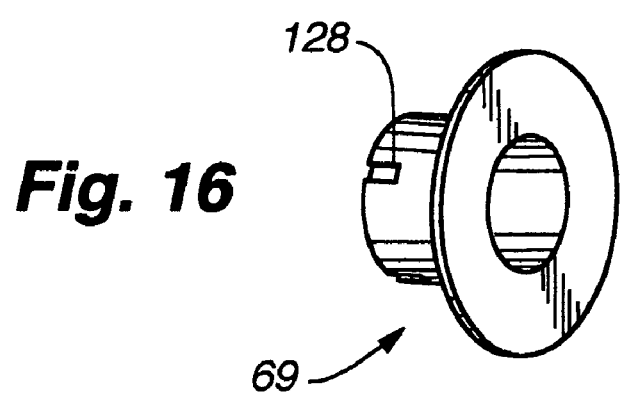
FIG. 16 is a front perspective view of the clutch plate collar member of the clutch mechanism of the present invention.
Figure 18:
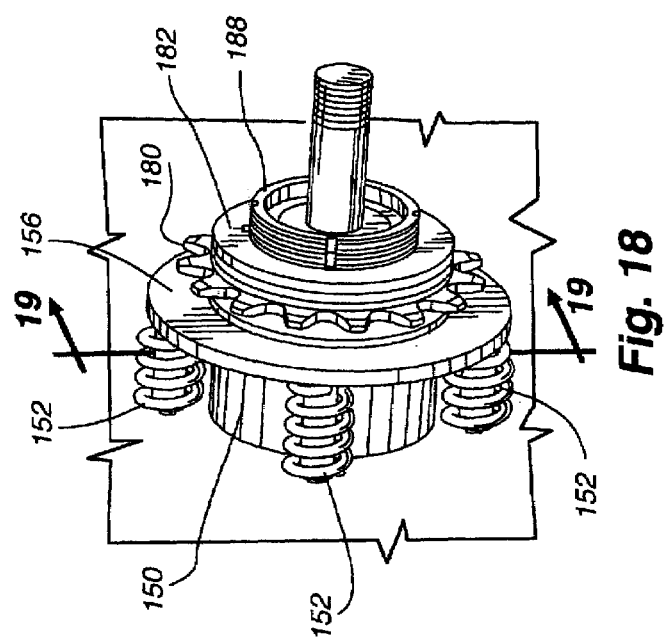
FIG. 18 is an enlarged perspective view of the embodiment of the present invention as shown in FIG. 17.
Figure 17:
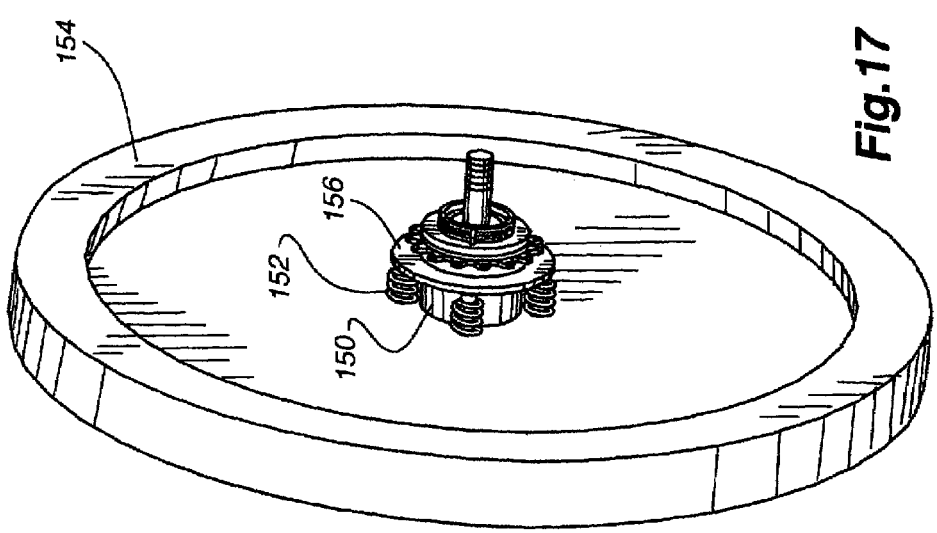
FIG. 17 is a perspective view of a high-inertia flywheel incorporating an alternative embodiment of the clutch mechanism of the present invention.
Figure 19:
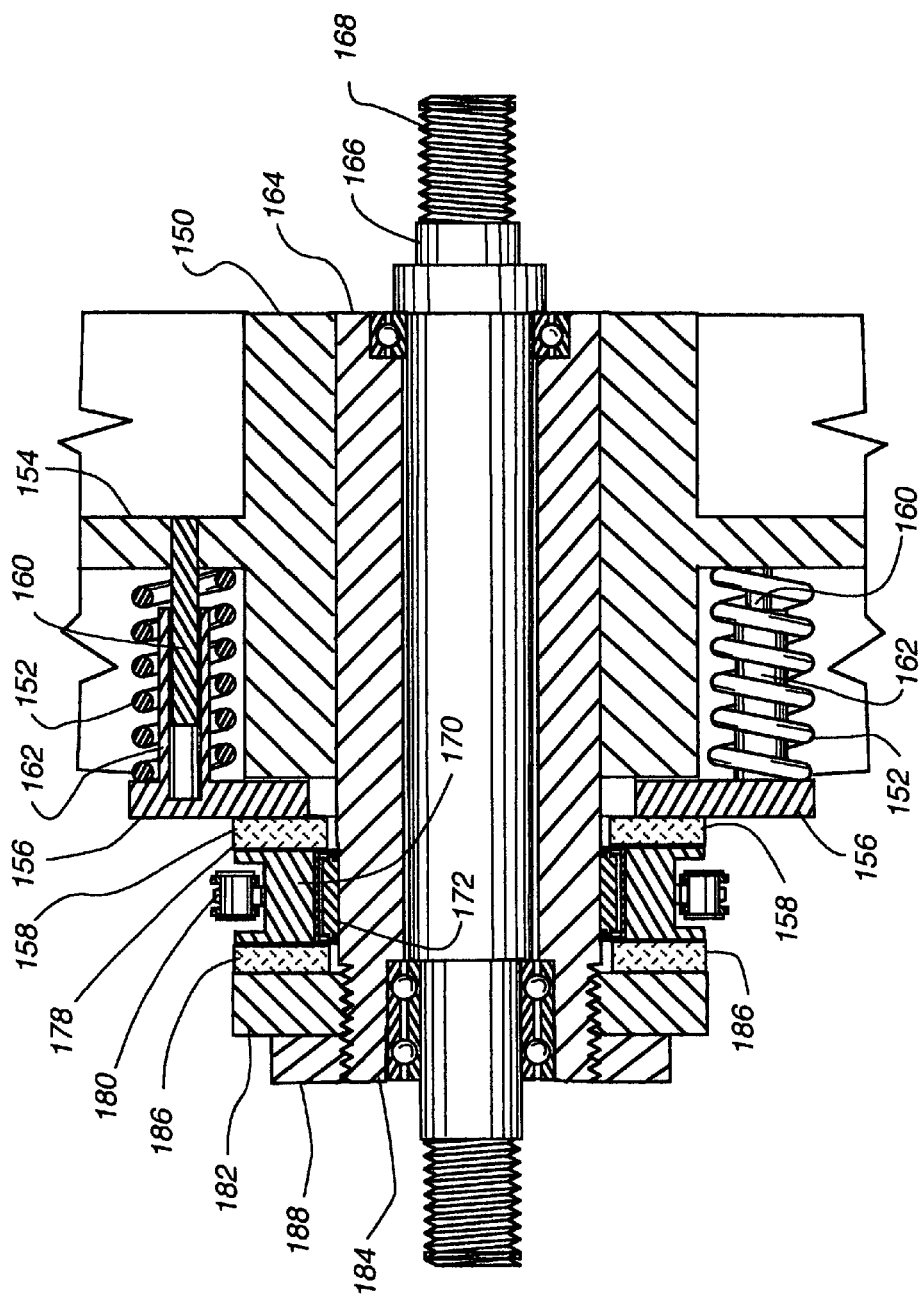
FIG. 19 is a section taken along line 19—19 of FIG. 18.

Referring to FIGS. 5A and 5B, the inner flange 122 is able to move axially (longitudinally) along the all or a portion of the length of the cylindrical main body 118 of the clutch plate collar 69. Referring to FIGS. 7, 8 and 9, the inner flange 122 has a central bore 124, defining a plurality of radially inwardly extending keys 126. Corresponding longitudinally extending slots 128 are formed on the surface of the cylindrical main body of the clutch plate collar 69 at its inner end, and extend at least partially along the length of the main body, to receive the keys 126 and allow the inner flange 122 to move (float) axially along the length of the cylindrical main body, to the extent of the length of the slots. The benefit of the axial movement of the inner flange of the clutch plate collar 69 is described in more detail below. When the cylindrical main body 118 is threadedly connected to the axle housing 64, the inner flange is positioned so the keys are slidably received in the slots, and the inner flange is retained on the end of the cylindrical main body by the hub 62 or the axle housing (by end of axle housing as shown in FIG. 5A). The intersection of the keys 126 in the slots 128 make the inner flange turn with the cylindrical main body 118.

A one-way bearing 66, such as an INA shell-type roller clutch as found in the INA Bearing Company, Inc. of Fort Mill, S.C., catalog #305, 1988 at page 164, is mounted on the cylindrical main body 118 of the clutch plate collar 69 between the end of the slots 128 and the outer flange 120. The rollers of the bearing 66 engage the outer surface of the cylindrical main body member 118, and can slide (float) along the length of the main body, as described in more detail below. The one-way bearing permits direct-drive in one direction, and free-wheeling in the other rotational direction, also described in more detail below.

Referring to FIGS. 5A, 7, and 10–13, a sprocket collar 58 defines a central bore and is positioned concentrically over the cylindrical main body member 118 of the clutch plate collar 69, and is attached to the outer race of the one-way bearing. The sprocket collar 58 defines an outer radially extending engagement collar 130 spaced away but substantially coextensive with the outer flange 120 of the clutch plate collar 69, an inner radially extending engagement collar 132 spaced away from but substantially coextensive with the inner flange 122 of the clutch plate collar 69, and the slave sprocket 54 formed about the outer surface of the sprocket collar 58 and between the inner and outer extending collars 130 and 132. The chain 56 engages the slave sprocket 54. The engagement collars 130 and 132 are extensions of the sidewalls of the sprocket collar, and provide more surface area if needed for the clutch-function they perform, as defined below.

The following explains the relative movement and drive characteristics of the clutch plate collar 69, sprocket collar 58, and flywheel 44 with the structure described at this point.

When the slave sprocket 54 is driven in the forward direction (clockwise with respect to FIG. 3, counter-clockwise with respect to FIGS. 1 and 2) by the chain 56, the one-way bearing 66 engages and causes the slave sprocket 54 to rotate the sprocket collar 58, in turn rotating the clutch plate collar 69, which in turn rotates the axle housing 64, which causes the flywheel to turn. If the slave sprocket 54 is caused to move in the opposite direction (counter-clockwise in FIG. 3, clockwise in FIGS. 1 and 2), the one-way bearing would allow the sprocket collar 58 to free-wheel on the clutch plate collar 69.

Ideally a friction clutch or braking material 70 in the form of a flat washer (a disk with a central aperture formed therein) is positioned between the outer flange 120 of the clutch plate collar 69 and the outer collar 130 of the sprocket collar 58, and between the inner flange 122 of the clutch plate collar 69 and the inner collar 132 of the sprocket collar, as best shown in FIGS. 5A, 5B, and 7. The friction clutch material 70 can be attached to either the outer flange 120 or the outer collar 130, and the friction clutch material 70 can be attached to either the inner flange 122 or the inner collar 132, to anchor the clutch material. The clutch material 70 can be felt, cork, standard brake material, or any material that provides a sufficient frictional relationship between the coextensive flanges and collars. Preferably, clutch facing, as shown in McMaster-Carr Company catalog number 101, 1995, at page 2530, is used at a thickness of approximately 2.0 mm. Insert description for collar for inside diameter for free-floating and not connected to either side. In some instances, such as when the clutch material is not attached to either the clutch plate collar or the sprocket collar, but instead just floats between the two, a bearing washer is attached to the perimeter of the central aperture to help support the clutch material on the axle housing.

Compression means, such as a compression spring 72, is positioned around the hub 62 of the flywheel 44 to engage the inner flange 122 of the clutch plate collar 69 to bias the inner flange toward the outer flange 120 of the clutch plate collar. The spring 72, such as a jumbo compression spring in the McMaster-Carr catalog number 101, biases the inner flange 122 outwardly to clamp the clutch material 70 between it and the inner collar 132, and also clamps the clutch material 70 between the outer collar 130 and the outer flange 120. The designed axial movement of the inner race (such as by sliding) on the cylindrical main bearing 66 (keys 126 sliding in the slots 128) allows the sprocket collar 58 to float and transmit the force of the spring 72 to the outer flange 120. The combination of the bias force created by the spring 72, and the engagement of the clutch plate collar 69 and the sprocket collar 58 with the clutch material 70 inbetween creates a friction force having an upper limit ("break free") force required to cause the sprocket collar 58 to move independently of the clutch plate collar in the reverse direction.

For instance, where the spring force is approximately 225 pounds when fully compressed, and the clutch material has an inner diameter of 1.65 inches and an outer diameter of 2.52 inches, where two clutch material disks were used (FIG. 5B), the break free force has been tested to be approximately 55 pounds at the pedal. It has been found that as the spring extends due to wear of the clutch material, the spring force reduces to approximately 200 pounds, and the break free force actually increases. This is believed to be due to the fact that the engaging surfaces clamping the clutch material become polished and increase the surface area, thus increasing the static friction force to be overcome.

The following explains the relative movement of the clutch plate collar 69, sprocket collar 58 and flywheel 44 given the structure described to this point. When the slave sprocket 54 is driven in the forward direction, as defined above, the one-way bearing creates the direct-drive relationship with the flywheel 44 desired for this type of exercise bicycle. When the slave sprocket 54 is driven in the backward direction, or there is a reverse force applied to the slave sprocket to attempt to rotate it in a direction opposite the direction of rotation of the flywheel, the one-way bearing does not drive the flywheel 44, but instead allows the pedals to free wheel. However, the friction force generated between the clutch plate collar 69 and the sprocket collar 58 due to the engagement of the outer flange 120 and the outer collar 130 with the inter-positioned clutch material 70, and the inner flange 122 and inner collar 132 with the inter-positioned clutch material 70, acts to create a threshold friction force that must be overcome to allow the rider to drive the sprocket collar 58 independent of the flywheel 44. If the force applied by the rider to the pedals is large enough to overcome the friction ("break free") force, then the pedals cause the sprocket collar 58 to turn independently of the clutch plate collar 69, with the clutch material 70 being rubbed and worn down in the process.

Figure 5C:
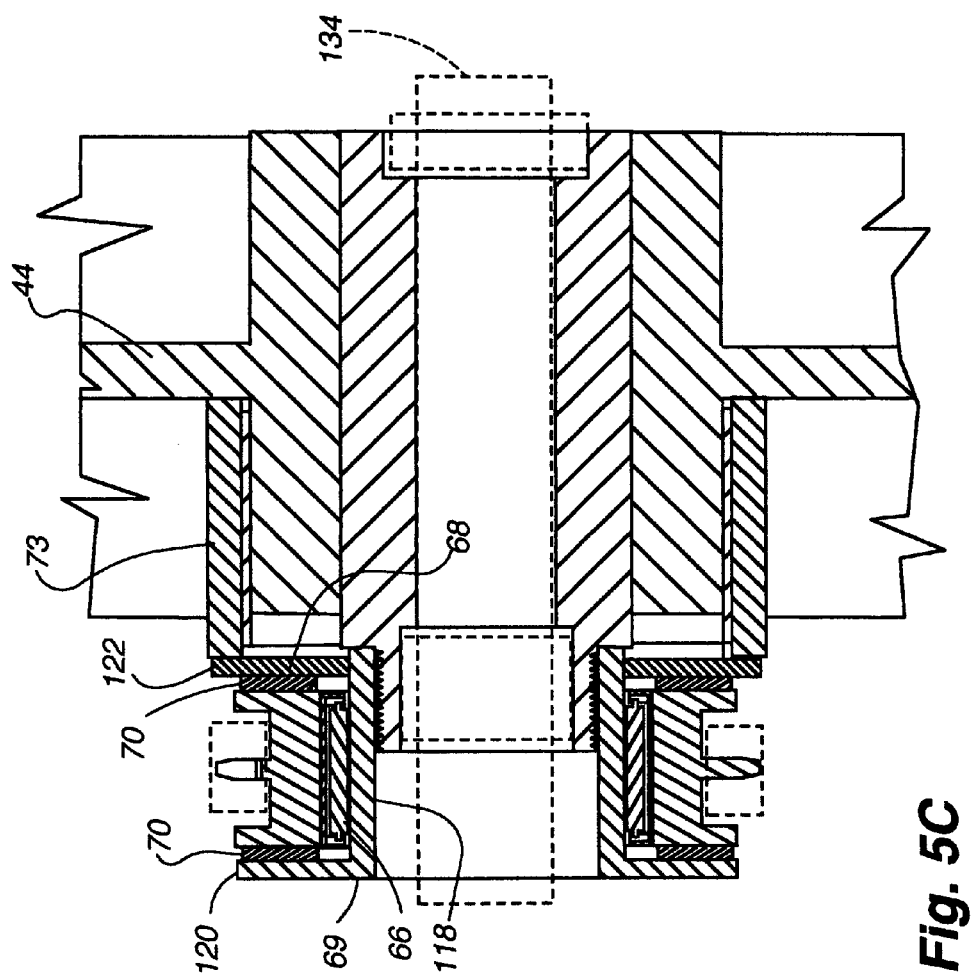
FIG. 5C is a representative section similar to FIG. 5A showing a different type of compression member.
Figure 6:
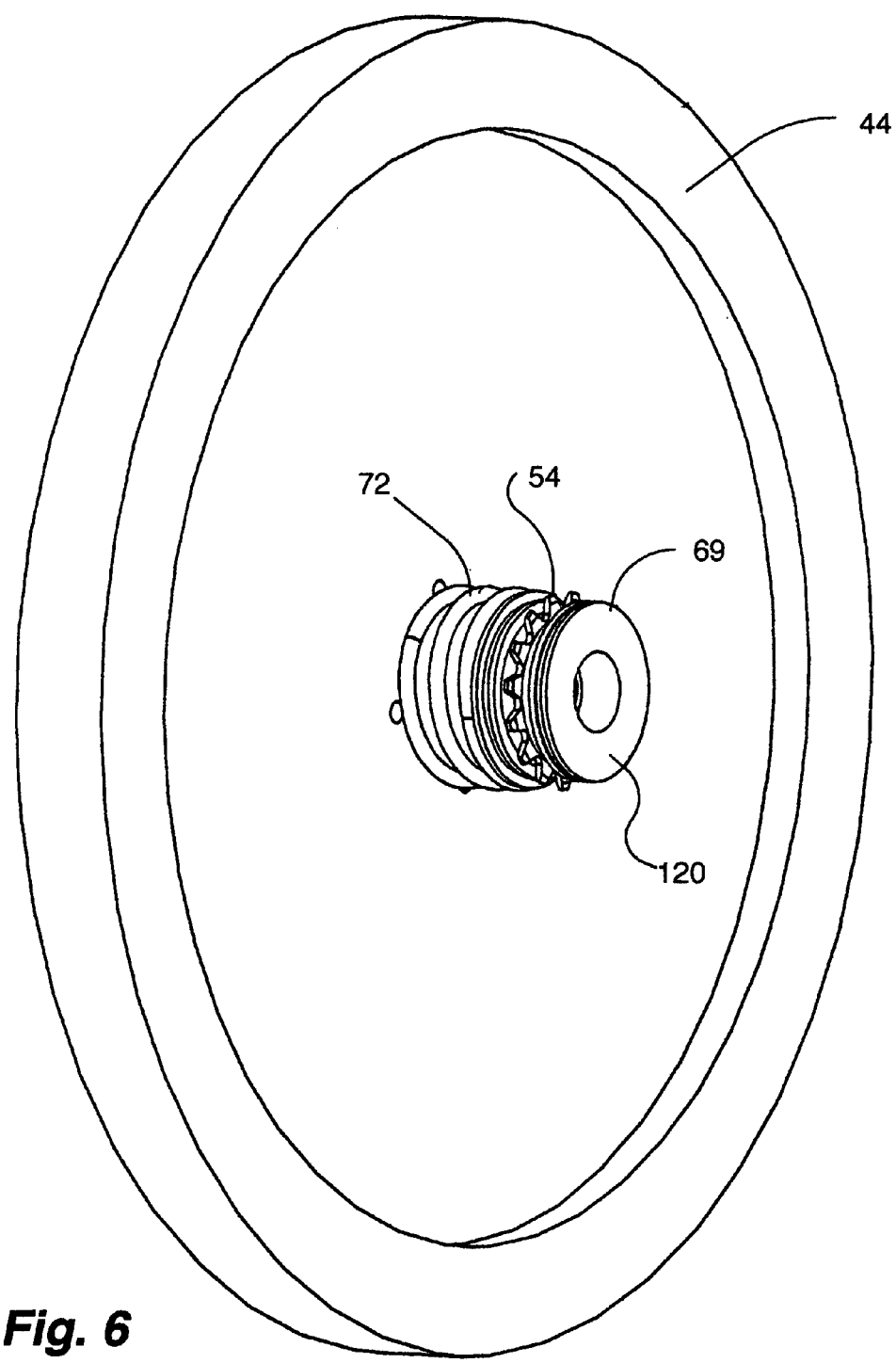
FIG. 6 is a perspective view of a high-inertia flywheel incorporating one embodiment of the clutch mechanism of the present invention.

As the clutch material 70 wears down and becomes thinner, the spring 72 extends to push the inner flange 122 (floating) along the slots to maintain the appropriate force on the clutch material 70. The sprocket collar 58 is also pushed outwardly to maintain the desired force, and resulting "break free" characteristics. The spring 72 thus allows for automatic adjustment to compensate for the wear of the clutch material 70. The spring 72 must be selected to have a relatively predictable and stable spring constant along its length of extension to insure the development of the proper friction forces. The spring can be replaced with an elastomeric tube 73 having sufficient spring properties in the axial direction, such as is shown in FIG. 5C. Some elastomeric materials have very stable spring constants. One such suitable elastomeric material is a polyurethane made by Kryptonics Inc. of Louisville, Colo. Preferably, the tube 73 is approximately 1 inch long, 0.887 inches when initially compressed, and has a wall thickness of approximately 0.225 inches. In addition, an adjustable compression spring could also be used that would allow the spring force to be adjusted to modify the break free force when desired.

The inner or outer clutch material 70 can be replaced by a bearing if it is desired to use only one clutch material 70. The break-free force threshold may be modified accordingly as a result.

Similar relative movement is found when the exercise bicycle incorporating the present invention is in use, and more clearly depicts the advantages of the free wheel clutch mechanism of the present invention. When a rider is exercising on the exercise bicycle, the forward drive of the drive train causes the slave sprocket 54 to drive the sprocket collar 58 in the direction of engagement of the one-way bearing, in the end to drive the flywheel 44 in a direct drive manner. If the rider desires, by applying a force of approximately 50 pounds in the opposite direction, the threshold friction force between the clutch plate collar 69, the sprocket collar 58 and the clutch material 70 is overcome (the "break free" force), and the sprocket collar 58 can free wheel with respect to the clutch plate collar 69 and the flywheel 44. The sprocket collar 58 thus moves in the opposite direction with respect to the direction of rotation of the flywheel 44. The rider can thus pedal irrespective of the movement of the flywheel 44 until the friction between the clutch plate collar and the sprocket collar (caused by the clutch material) reduces the rpms of the flywheel to a point where, based on the gear ratio, the rpms match to cause "lock-up".

In a more extreme situation, if the foot of the rider slips off the pedal and the pedal strikes the rider's leg, a sufficient force is generated to overcome the "break free" force and the pedals can stop to reduce the chance of serious injury, letting the flywheel continue to rotate until the friction force stops the rotation of the flywheel.

An axle 134 (FIGS. 5A and 5B) is positioned through the bore in the hub, with associated bearings to support the flywheel 44 and allow it to rotate as driven by the gear train.

The one-way bearing is not necessary for the application to work on an exercise bicycle. However, without the one-way bearing the sprocket collar would "free wheel" in the forward direction too when the drive force was greater than the "break free" force, thus limiting the amount of force the rider could apply while pedaling the bicycle in the forward direction.

The one-way bearing 66 can be replaced by a spring-loaded ratchet and pawl drive mechanism found in normal bicycle applications, or other one way drive mechanisms that can functionally replace the one-way bearing described above. One such suitable commonly available ratchet and pawl mechanism is the LMA-8 from the LIDA Machinery Company, Ltd. of Taoyuan, Taiwan, as shown in the Taiwan Bicycle Source 1997–98 catalog at p. 370.

FIGS. 8 through 16 show details of some of the components described above.

An alternative embodiment of the free wheel clutch mechanism is shown in FIGS. 17–20. This alternative embodiment works on the same principle as the first embodiment described above, except basically replaces the single large spring surrounding the hub 150 with the plurality of smaller springs 152 positioned between the flywheel 154 and the inner clutch plate 156. These plurality of springs 152 act to push the inner clutch plate 156 outwardly as the clutch material 158 wears down from use. As can best be seen in FIGS. 19 and 20, each of the plurality of springs surrounds a guide rod 160 mounted to the flywheel 154 which is received in a guide bore 162 mounted to and extending from the inside side of the inner clutch plate 156. The sliding interaction between the guide rod 160 and the guide bore 162 helps ensure that the inner clutch plate 156 is squarely moved outwardly under the bias of the springs as the clutch material wears as a result of use. The interaction of the guide rod with the guide bore also causes the inner clutch plate 156 to turn with the flywheel 154 because the guide rods are laterally fixed in position inside the guide bores, and as the guide rods turn with the movement of the flywheel, they cause the inner clutch plate to turn also.

The axle housing 164 is press-fit into the hub 150 and extends from the flywheel 154, and has an outer end 166 with external threads. After the inner clutch plate 156 and associated compression springs 152 are mounted over the axle housing and positioned adjacent the hub, the slave gear collar 170 is positioned to engage the outer surface of the axle housing 164 as in the previous embodiment, including having the same bearing structure 172. The slave gear collar has an inner surface 174 adjacent the outer surface 176 of the inner clutch plate, between which is positioned an inner clutch material washer 178. The inner clutch material washer 178 is preferably fixed to either the outer surface of the inner clutch plate 156 or the inner surface of the slave gear collar 170. A set of gear teeth 180 are formed about the outer circumference of the slave gear collar 170 for receiving the chain used to drive the flywheel.

The outer clutch plate 182 (or anchor plate) is then threaded on to the externally threaded outer end 184 of the axle housing. An outer clutch material washer 186 is positioned between the outer surface of the slave gear collar 170 and the inner surface of the outer clutch plate 182. Preferably, the outer clutch material washer 186 is fixed to either the outer surface of the slave gear collar 170 or the inner surface of the outer clutch plate 182. The outer clutch plate is fixed to the axle housing by a lock-nut 188 to keep the outer clutch plate from turning loose under the force of the free wheel mechanism.

This alternative embodiment of the present invention operates in fundamentally the same manner as the previously described embodiment. When a reverse force is applied to the drive train, normally through a reverse force being applied to the pedals, and this reverse force overcomes the "break free" force, the slave gear overcomes the friction force between the slave gear collar 170 and the outer clutch plate 182 and inner clutch plate 156 which rotate with the flywheel 154. This allows the flywheel to continue spinning while the drive train is either stopped, pedaled backwards, or pedaled more slowly than the flywheel is spinning. The bearings 172 connecting the slave gear collar 170 to the axle housing 164 are one-way bearings as described above, and when the drive train is actuated in the normal or forward direction, the bearings lock and act as a direct drive connection between the drive train and the flywheel.

When turned in the reverse direction, the bearings 172 allow the slave gear collar 170 to free-wheel, the free wheeling of which is restricted by the frictional engagement of the slave gear collar 170 with the surrounding clutch material 178, 186. The compression springs 152 apply the force to the inner clutch plate 156 which presses the inner clutch material 178 against the slave gear collar. The slave gear collar 170 can move longitudinally on the axle housing 164 (the bearing allows small amounts of movement in this direction) and thus transmits a force to the outer clutch material 186, and finally to the outer clutch plate 182. As the inner or outer clutch material wears down, the springs 152 extend and push the inner clutch plate 156 outwardly and thus maintain the contact necessary for the frictional engagement between the inner clutch plate 156, the inner clutch material 178, the slave gear collar 170, the outer clutch material 186, and the outer clutch/anchor plate 182.

Figure 20:
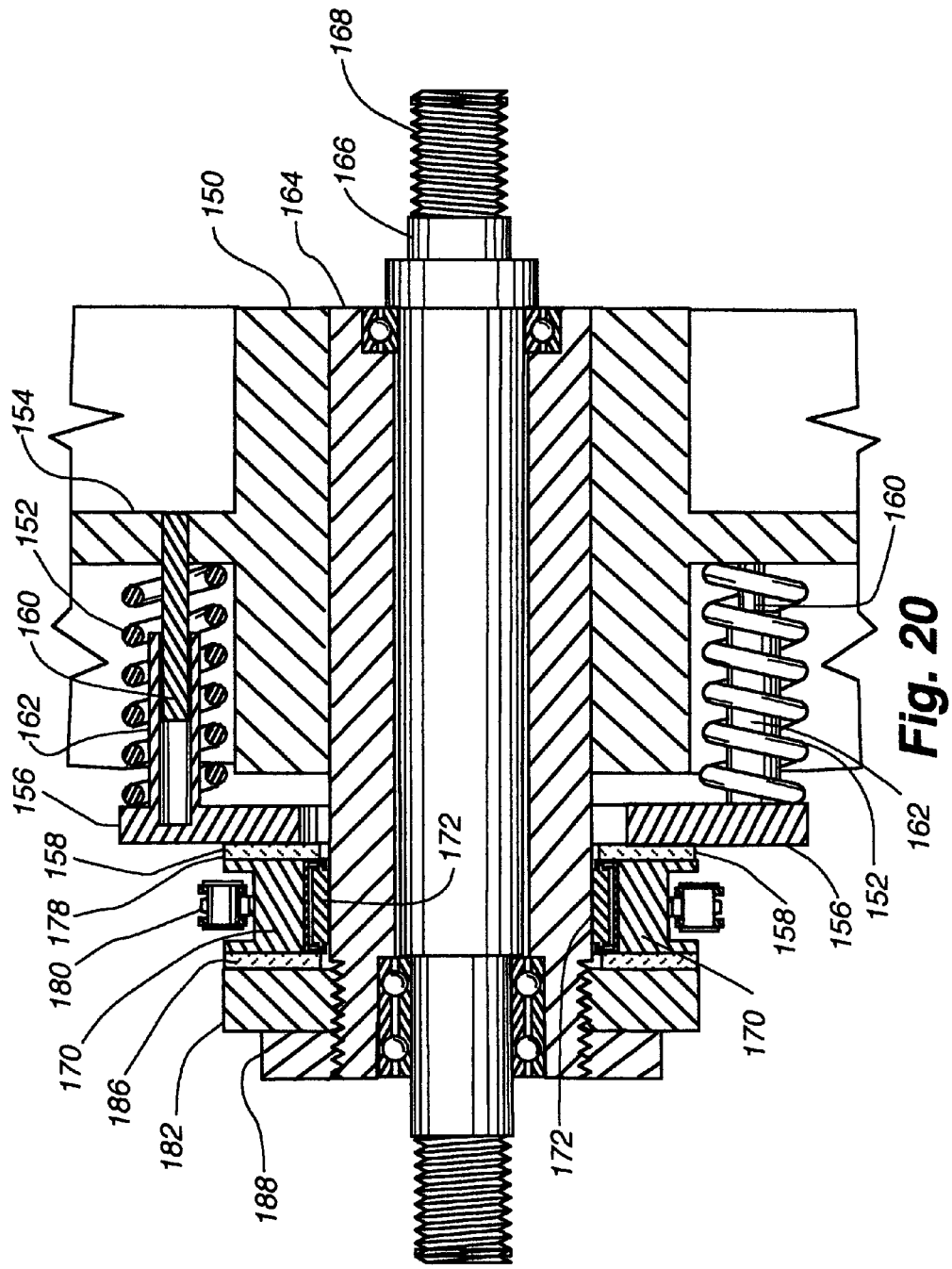
FIG. 20 is a representative section of the embodiment shown in FIG. 19, showing the effect of worn clutch material.

FIG. 20 shows the adjusted relationship of the structure of this alternative embodiment when the inner and outer clutch material washers 178, 186 have worn down. Contrasting FIGS. 19 and 20, note the gap between the inner clutch plate 156 and the outer end of the hub 150. The bearings 172 allow the slave gear collar 170 to move longitudinally on the axle housing 164. Either one of the inner or outer clutch materials 178, 186 can be replaced with a bearing if it is determined that they are unnecessary.

Figure 21:
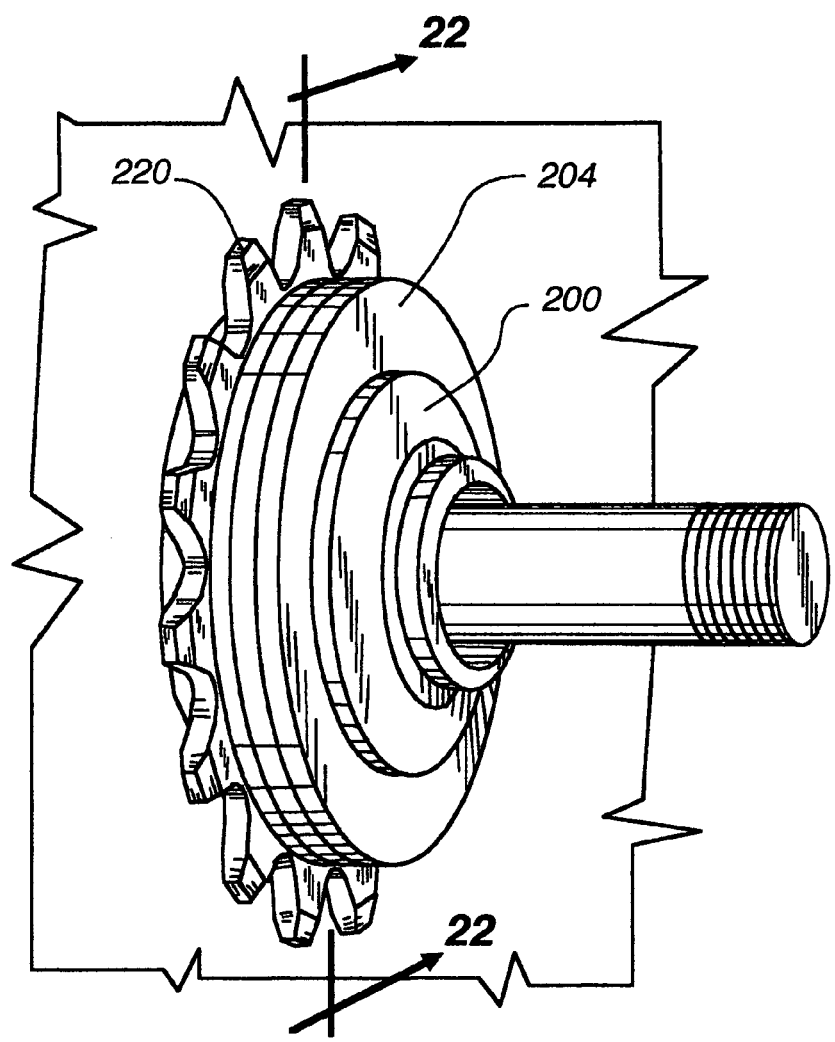
FIG. 21 is an enlarged perspective view of another embodiment of the present invention.
Figure 22:
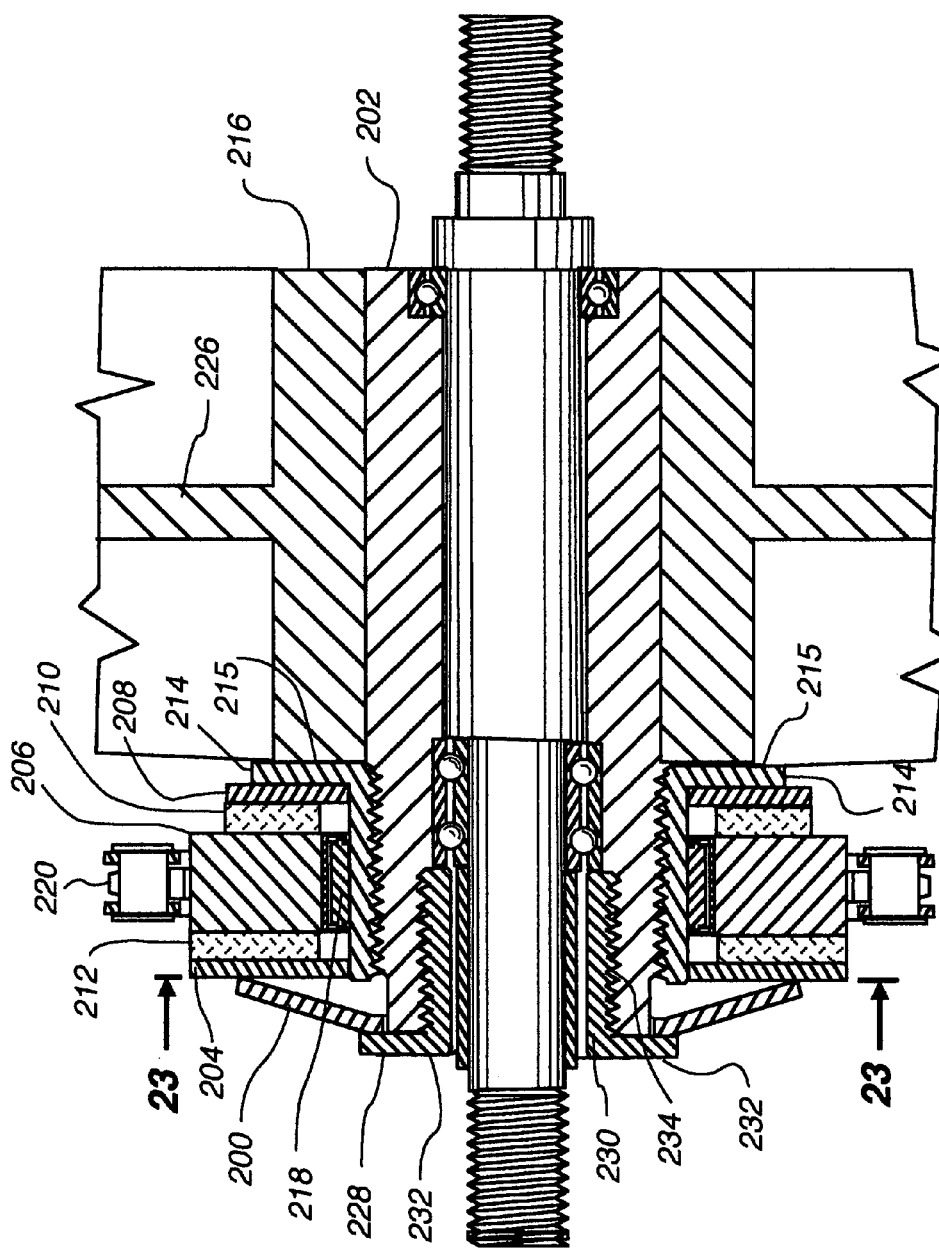
FIG. 22 is a section taken along line 22—22 of FIG. 21.
Figure 23:
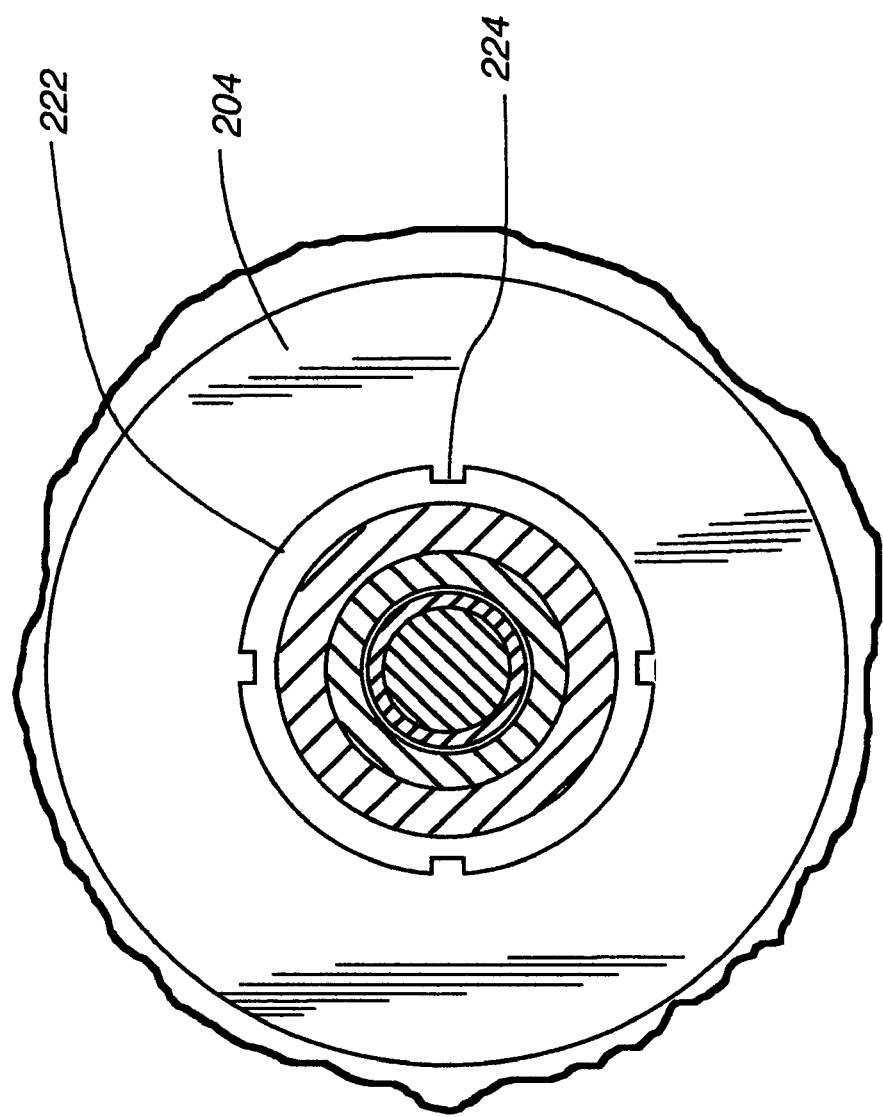
FIG. 23 is a section taken along line 23—23 of FIG. 22.

Another alternative embodiment is shown in FIGS. 21–23. In this alternative embodiment a Belleville washer 200 is mounted on the end of the axle housing 202 to bias the outer clutch plate 204 inwardly to create the desired friction force between the slave gear collar 206 and the outer and inner clutch plates 204, 208 through the inner and outer clutch material washers 210, 212. In the second alternative embodiment a retainer 214 having an outwardly flanged inner end 215 is threaded on to the end of the axle housing 202 extending from the hub 216, which has external threads. The outwardly extending flange 215 of the retainer butts up against the hub 216. The inner clutch plate 208 is then positioned next to the outwardly extending flange 215 and is retained in rotational position therewith by keys in slots or by any other suitable attachment method, such as welding (as shown in FIG. 22). Alternatively, the outwardly extending flange can act as the inner clutch plate.

An inner clutch material washer 210 is positioned adjacent to and in contact with the inner clutch plate 208, and the slave gear collar 206 is mounted over the cylindrical body of the retainer 214. The slave gear collar 206 is similar to the slave gear collars described in the previous two embodiments and includes a bearing 218 positioned between the slave gear collar 206 and the outer circumference of the retainer 214, the bearing 218 being a one-way bearing allowing the slave gear collar 206 to free-wheel when turned in a reverse direction, and locking to provide a direct drive when turned in the forward direction. Gear teeth 220 are formed on the outer circumference of the slave gear collar 206 for engagement with the chain of the drive train. An outer clutch plate 204 is positioned over the outer circumference of the retainer 214. As shown in FIG. 23, the outer clutch plate 204 defines a central bore 222 having at least one key 224 formed for mating insertion into a corresponding slot formed in the retainer 214. The mating key and slot relationship between the outer clutch plate 204 and the retainer 214 makes the outer clutch plate turn with the flywheel because the retainer turns with the flywheel 226 and the rotational interference between the key and the slot causes the outer clutch plate 204 to turn also, in addition to allowing the outer clutch plate to float or move inwardly and outwardly with respect to the inner clutch plate 208 along the body of the retainer as the friction clutch material 210, 212 wears down.

The Belleville washer 200 is positioned about the end of the axle housing to engage the outer clutch plate 204 with the bias force. The bias force is created by an outer retainer 228 which defines a cylindrical main body 230 having external threads and an outwardly extending flange 232 at one end. The outer end of the axle housing 202 defines internal threading 234 such that the cylindrical main body 230 of the outer retainer 228 threads into the outer end of the axle housing 202 to the point where the outwardly extending flange 232 abuts the outer end of the axle housing and also engages the inner rim of the Belleville washer 200 to compress the Belleville washer against the outer clutch plate 204. The compression of the Belleville washer 200 against the outer clutch plate 204 causes the outer clutch plate to be biased inwardly against the outer friction clutch material 212, which is pushed against the slave gear collar 206, which in turn is allowed to relatively float on the outer surface of the inner retainer 214 to push against the inner clutch material 210 and in turn frictionally engage the inner clutch plate 208.

As the slave gear collar 206 is driven in the forward direction by the drive train, the one-way bearings 218 lock and create a direct drive relationship. When a sufficient reverse force is applied to the slave gear collar through the drive train, the one-way bearings release and allow the drive train collar to free-wheel under the influence of the frictional relationship with the inner and outer clutch plates, similar to the interaction as described with respect to the embodiments above.

As the clutch material 210, 212 wears down and becomes thinner, the Belleville washer 200 extends to continue to create a friction force in the clutch system by pushing the outer clutch plate 204 towards the inner clutch plate 208, thereby clamping the inner and outer clutch material and the slave gear collar 206 therebetween.

Figure 24:
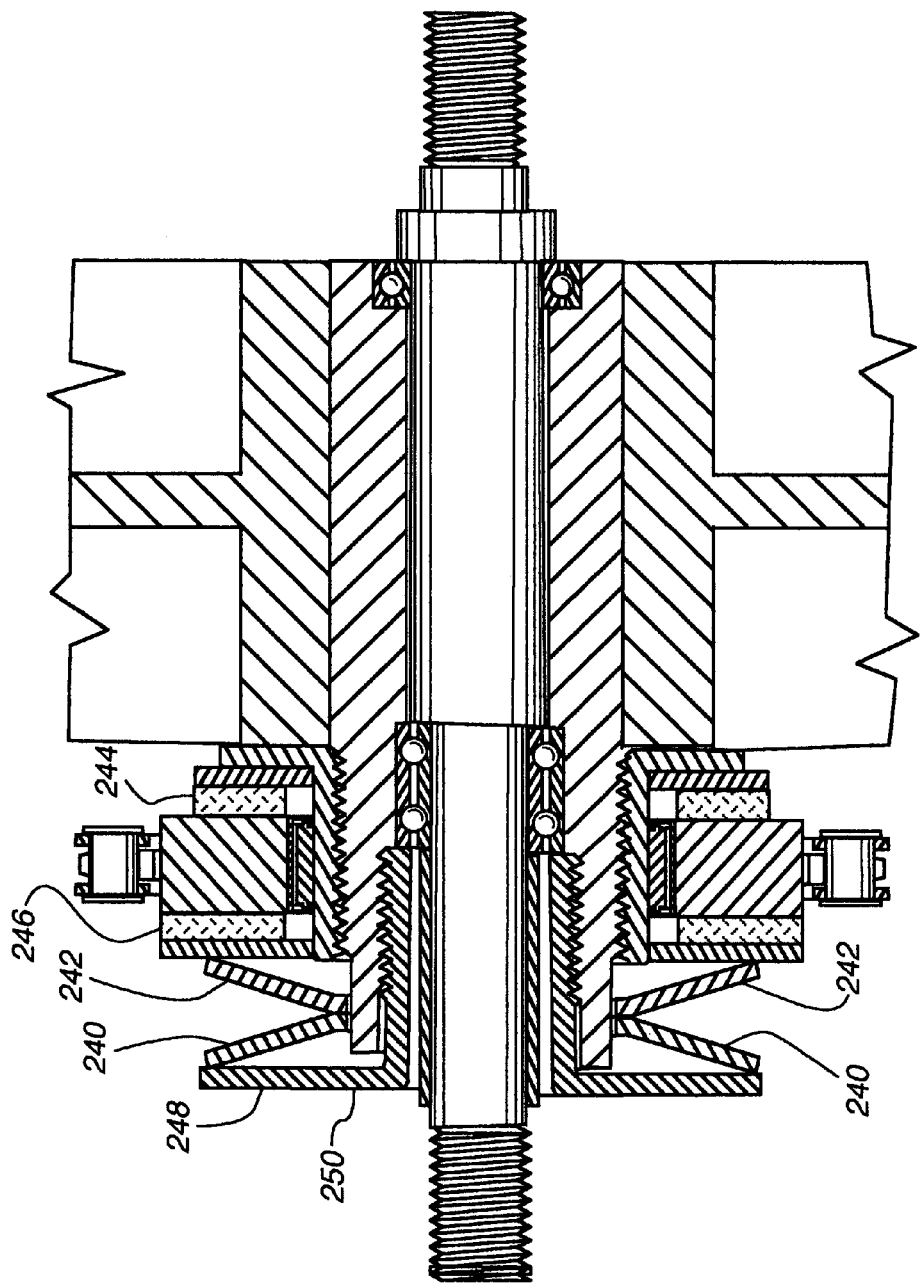
FIG. 24 is a representative section of an alternative embodiment similar to that shown in FIGS. 22, 23 and 24.

Another alternative embodiment is disclosed in FIG. 24 which shows two Belleville washers 240, 242 positioned back to back to allow for a longer adjustment stroke due to the wear of the inner and outer clutch material washers 244, 246. In this third embodiment the outwardly extending flange 248 of the second retainer 250 is enlarged to engage the outer rim of the second Belleville washer 240. Belleville washers are very stiff and provide a great deal of force through the length of their extension.

Figure 25:
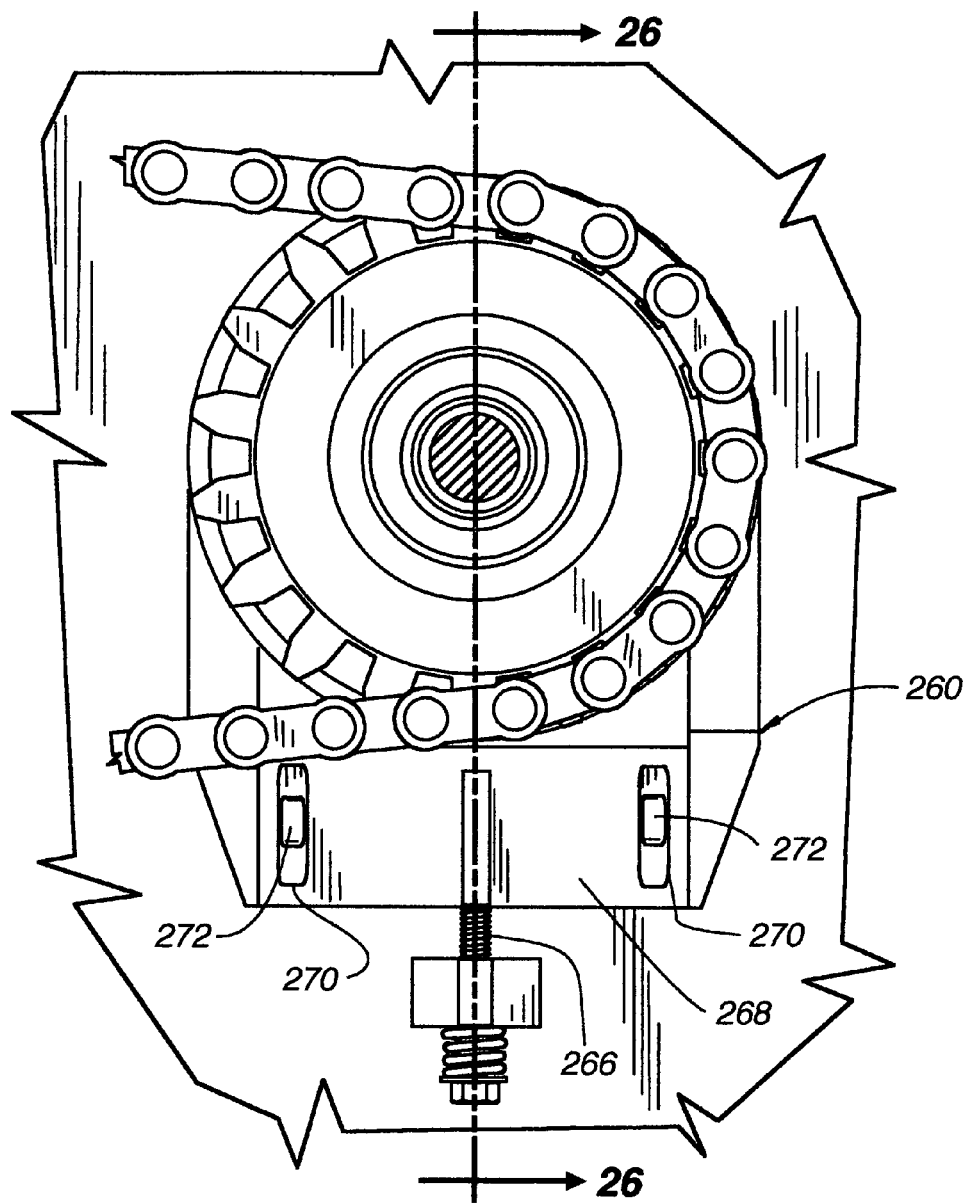
FIG. 25 is an elevation view of another embodiment of the present invention.
Figure 26:
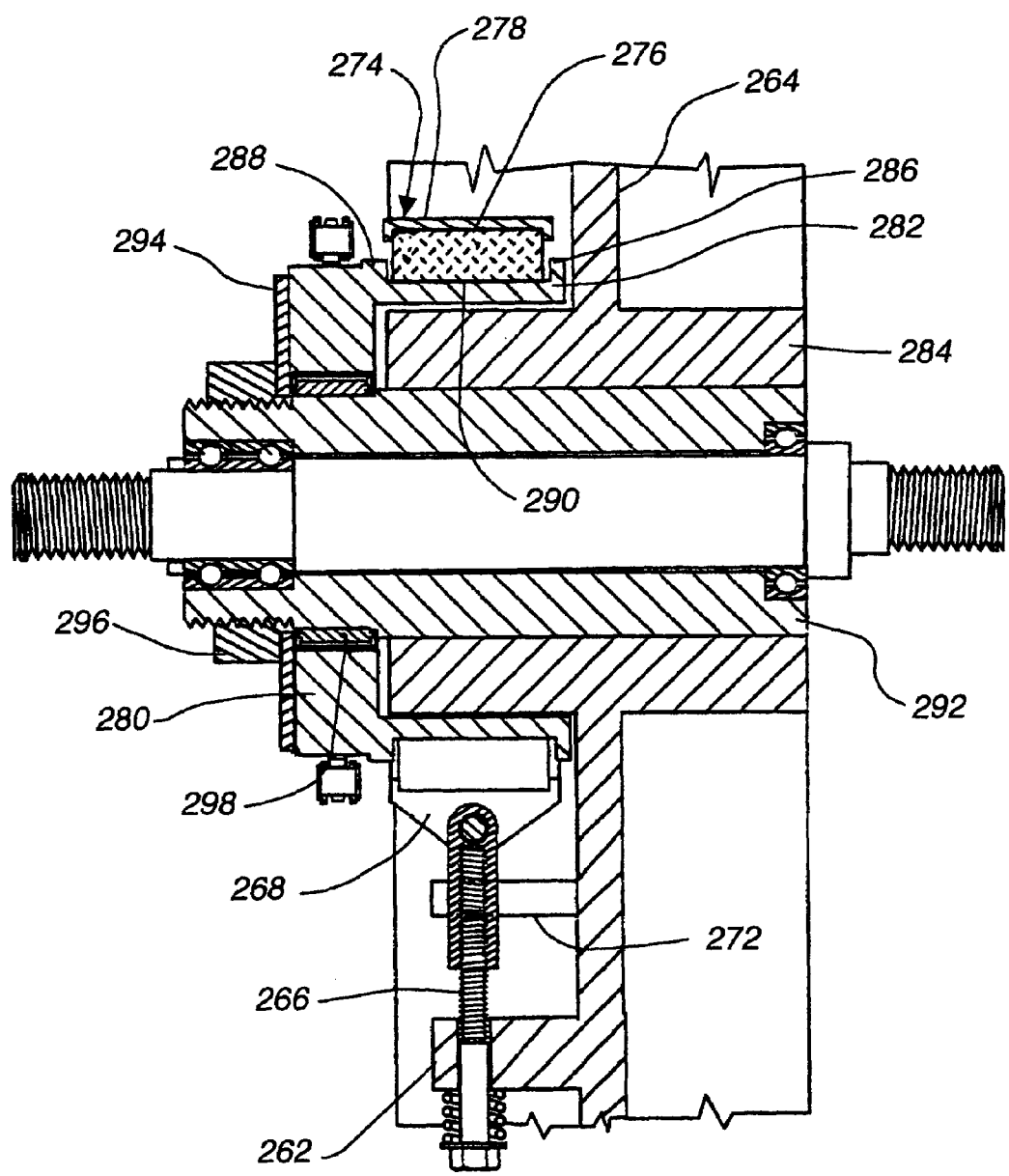
FIG. 26 is a section taken along line 26—26 of FIG. 25.

Another alternative embodiment is disclosed in FIGS. 25–26. This fourth alternative embodiment utilizes a band-brake to create the frictional break-free force. The band-brake 260 includes a retainer 262 fixed to the flywheel 264 through which is positioned a spring loaded adjustment screw 266 which attaches to a housing 268. The housing includes two guide slots 270 for slidably receiving tabs 272 formed on the flywheel. The housing is also fixed to the opposite ends of a belt 274. The slidable engagement of the guide slots 270 on the tabs 272 help ensure a properly oriented adjustment of the band-brake by the spring loaded screw. The slots are formed in the housing of the band-brake, the housing being attached to a belt, with the band-brake material 276 attached to the inside surface a reinforcement sheathing 278 of the belt (as best seen in FIG. 26). The tabs, spring loaded threaded screw, housing and belt are all fixed to rotate with the flywheel. The spring surrounding screw 266 makes the system self-adjusting for wear of the band material by applying a preferably constant tension load on the belt through the housing. The selection of the spring constant properties of the spring determines the amount of tension on the belt, and the amount of adjustment (displacement) the band-brake can accommodate.

As best shown in FIG. 26, the slave gear collar 280 defines an annular axial extension 282 which fits over a portion of the hub 284 without contacting the hub. This annular extension 282 defines an inner rim 286 and an outer rim 288, between which is an engagement surface 290. The band contacts the engagement surface 290 between the inner rim and the outer rim. The slave gear collar 280 includes the same bearing system as previously described for one-way engagement with the outer surface of the axle housing 292. The proper positioning of the slave gear collar 280 is maintained on the axle housing by a large washer 294 which is tightly pressed against the outer surface of the slave gear collar by a nut 296 to keep the slave gear collar from becoming imbalanced. A second set of one-way bearings could be positioned between the annular extension 282 from the slave gear collar and the outer surface of the hub over which the slave gear collar annular extension is positioned.

As the drive train is actuated in the forward direction by the rider, the one-way bearing 298 between the slave gear collar 280 and the axle housing 292 engages to cause a direct drive relationship between the drive train and the flywheel, as in the previously described embodiments. In the event a sufficient reverse force is applied to the slave gear collar through the drive train, the one-way bearing 298 releases and allows the slave gear collar to free-wheel subject to the frictional engagement of the slave gear collar and the belt 274. The engagement surface 290 is in frictional engagement with the belt to create the "break free" force. The "break free" force is determined by the tightness of the belt around the engagement surface on the annular extension 282 of the slave gear collar. This "break free" force resists the free wheeling of the slave gear collar on the axle housing 292 and provides the beneficial pedal-through feature of traditional direct drive exercise bicycles. It also allows the drive train to free-wheel when a sufficient reverse force is applied to the drive train, likely through the pedals and cranks, to allow the drive train to be driven at a relatively lower RPM than the flywheel, depending on the gear ratio.

As the frictional brake material 276 wears down, the housing 268 is adjusted by tightening the screw 266 to move the housing, and thus tighten the belt 274 around the annular extension 282 of the slave gear collar 280 to maintain the desired frictional engagement, resulting in the desired "break free" force.

Figure 27:
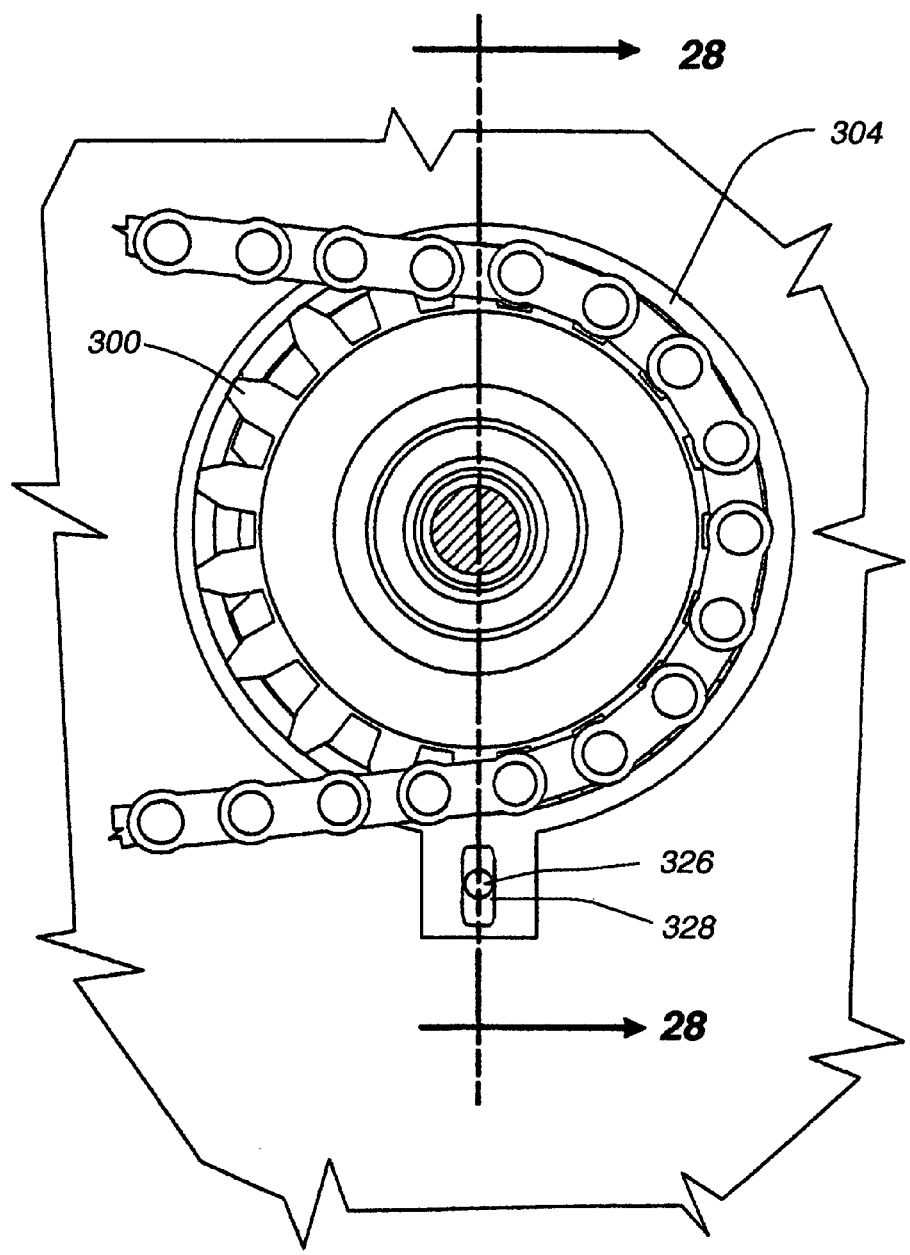
FIG. 27 is an elevation view of another embodiment of the present invention.
Figure 28:
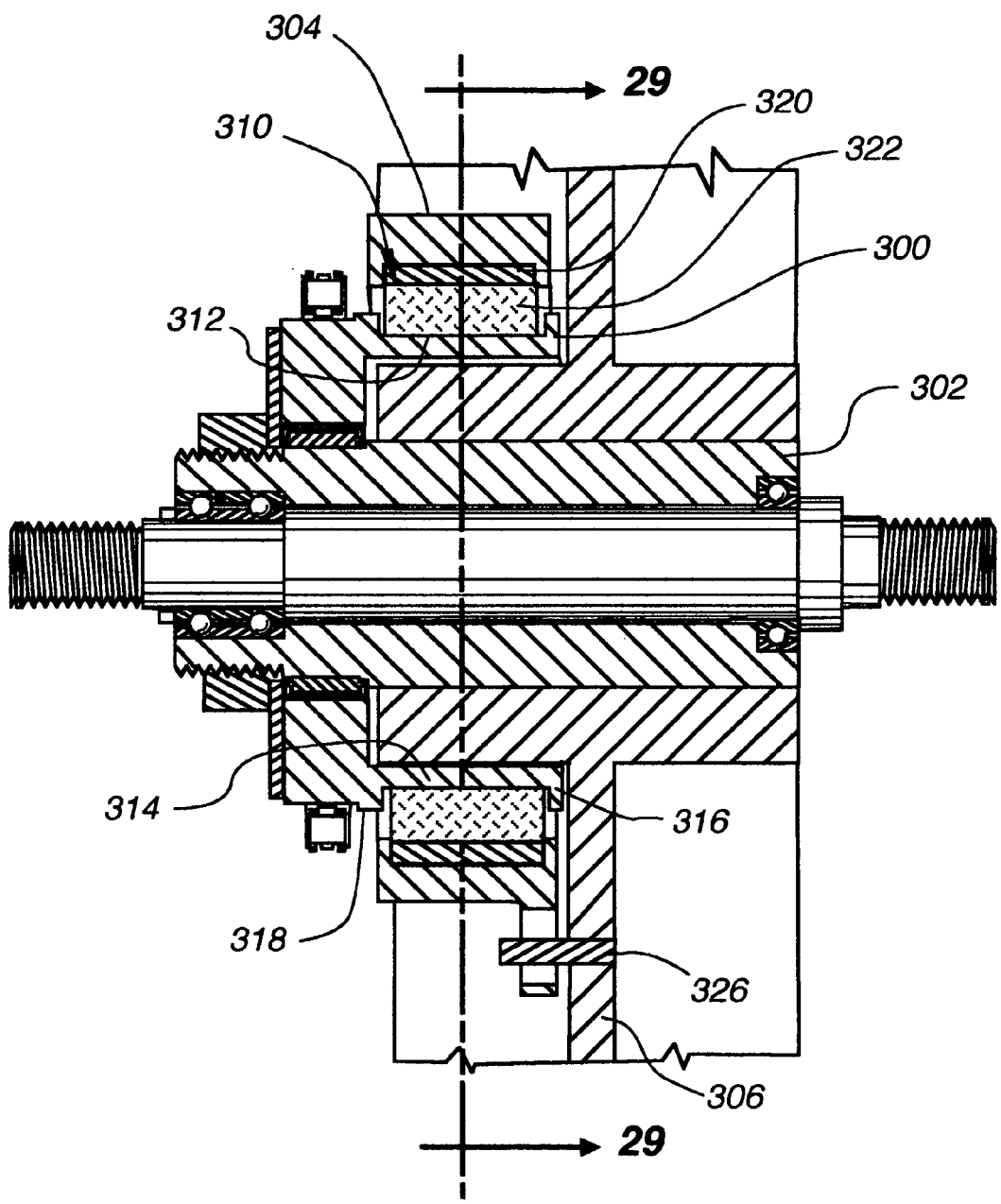
FIG. 28 is a section taken along line 28—28 of FIG. 27.
Figure 29:
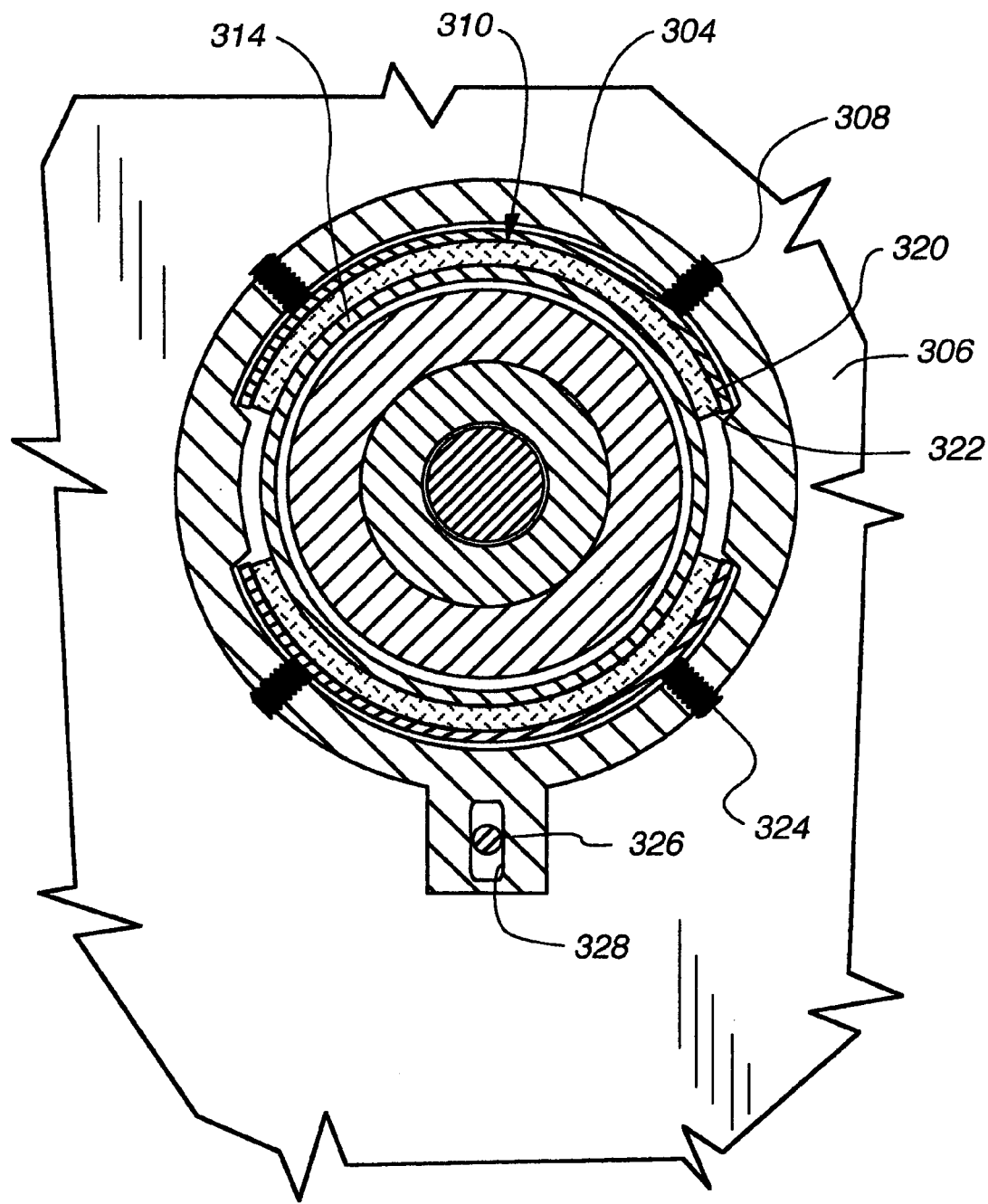
FIG. 29 is a section taken along line 29—29 of FIG. 28.

Another alternative embodiment is shown in FIGS. 27–29. In this embodiment, the slave gear collar 300 has the same structure as the previous embodiment described, and is held in engagement with the axle housing 302 in the same manner. A compression brake housing 304 is mounted in engagement with the flywheel 306 and includes means 308 for causing engagement of arcuate compression members 310 with the engagement surface 312 on the slave gear (sprocket) collar annular extension 314, between the inner and outer rims 316, 318. The arcuate compression members 310 have a hard backing 320 and a frictional clutch material 32 (2 mated to their inner concave surface for engagement with the slave gear collar annular extension 314. The brake housing 304 includes means 308 for radially adjusting the compression of the compression members against the annular extension 314, such as set screws which are threadedly adjustable through the brake housing to engage the hard back surface 320 of the arcuate compression members 310 to press the frictional material 322 of the compression members against the engagement surface 312 of the annular extension. These means can be self-adjusting to accommodate wear of the friction material, such as by being spring-loaded set-screws. As the frictional clutch material wears down, the set screws 324 can be used to maintain the proper compression of the compression members 310 against the engagement surface 312, which creates the desired "break free" force.

This embodiment operates in the same manner to allow a break free clutch mechanism on the flywheel as the previously described embodiments. The brake housing 304 is held in rotational fixed orientation with the flywheel by a pin 326 positioned through a slot 328 in the brake housing. The movement of the pin in the slot allows for uneven wear of the compression members 310.

Figure 30:
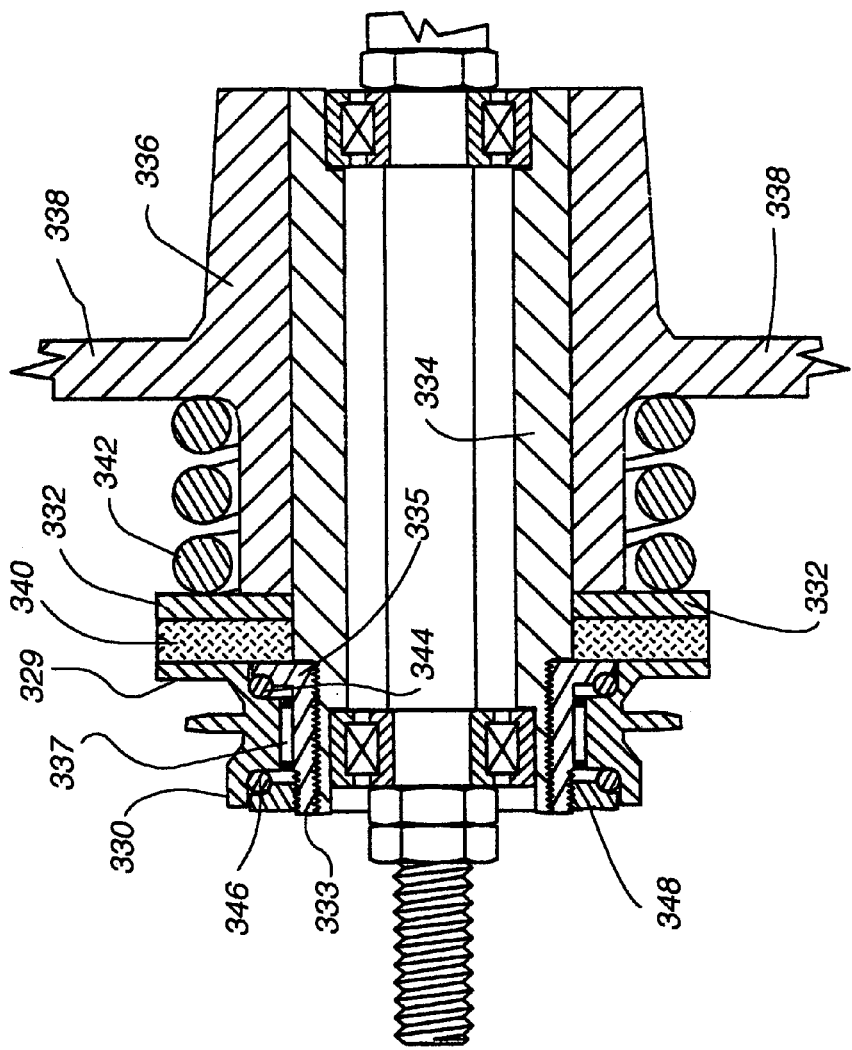
FIG. 30 is a representative section of another embodiment of the present invention.

Another alternative embodiment is shown in FIG. 30. Only one side, the inner side 329 as shown, of the sprocket collar 330 is used to create a frictional engagement with an engagement flange 332 attached to the axle housing 334 at the hub 336 of the flywheel 338. The sprocket collar is positioned on a sheath 333 threadably engaging the axle housing 334 at the hub 336, with a one-way bearing 337 (or ratchet and pawl mechanism) positioned between the sprocket collar and the sheath 333 for the same purpose as disclosed above with many of the other embodiments. Clutch material 340 is positioned between the side 329 of the sprocket collar 330 and the engagement flange 332, and can be attached to either one, to create the frictional engagement therebetween. The engagement flange is moveable along the axle housing of the hub to allow the friction force to be kept at a relatively constant level as the clutch material wears out. This self-adjustment, as described above, occurs when the spring 342, or other means, presses the engagement flange outwardly from the hub to clamp the clutch material against the inner side 329 of the sprocket collar 330. The sprocket collar 330 is supported on the inner and outer sides by an inner 344 and outer 346 bearing, respectively. The inside edge 335 of the sheath forms the outer race for the inner bearing 344, while the sprocket collar forms the inner race for both the inner 344 and outer 346 bearings. The outer race 348, or cone, threadedly engages the outer end of the sheath 333 to hold the sprocket collar 330 in place and provide a thrust bearing against which the spring 342 pushes.

Figure 31:
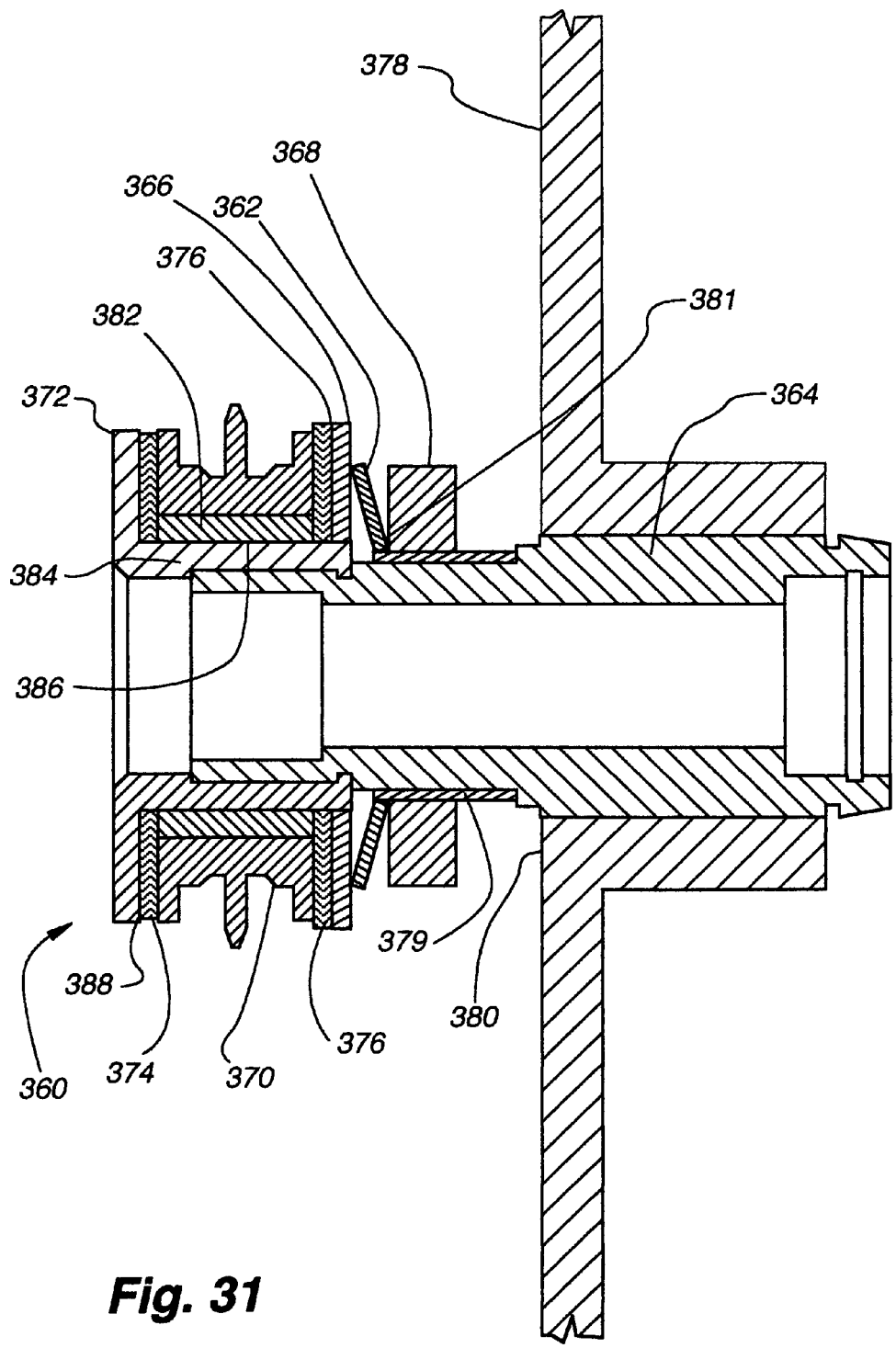
FIG. 31 is a representative section of an alternative embodiment of the present invention.

FIG. 31 illustrates an additional alternative embodiment of a free wheel clutch mechanism 360. This embodiment operates in fundamentally the same way as previously described embodiments. When a reverse force is applied to the drive train, normally through a reverse force being applied to the pedals, and this reverse force overcomes the break-free force, the slave gear overcomes the friction force between the slave gear collar and the inner and outer clutch plates which rotate with the flywheel.

In this alternative embodiment, preferably a Belleville washer 362 is circumferentially mounted on an axle housing 364 between an inner clutch plate collar 366 and a spring tensioner 368 to bias the inner clutch plate 366 outwardly to create the desired friction force between the slave gear collar 370 and the inner and outer clutch plates (366, 372) through the inner and outer clutch plate material washers (374, 376). Alternatively, a biasing member such as a coil spring may be used in place of the Belleville washer 362.

The spring tensioner 368 is coupled to the axle housing 364, and positioned between the flywheel 378 and the inner clutch plate collar 366. In this embodiment, the outside circumference 379 of the axle housing 364 extending between the outside edge 380 of the flywheel 378 and the inner clutch plate 366 is threaded. The spring tensioner 368 defines an internally threaded cylinder that threadedly engages the outside circumference 379 of the axle housing 364. Preferably, the spring tensioner 368 defines an outwardly extending flange 381 circumferential to the axle housing 364 that is adapted to center the Belleville washer 362 about the axle housing 364.

To provide space for the spring tensioner 368, a portion of the flywheel hub 364 adjacent the free wheel clutch mechanism 360 is preferably removed. As shown in FIG. 22, preferably the portion of the hub 216 that extends outwardly from the main body of the flywheel 226 along the axle housing 202 to the inner retainer 214 (366) is removed. Alternatively, a longer axle housing than illustrated in FIG. 22 may be used. Alternatively, the portion of the flywheel hub is not removed, and the Belleview washer 362 is positioned between the outside edge 215 of the flywheel hub 216 and the inner clutch plate collar 366, and a spring tensioner is not included.

In the preferred configuration, the Belleville spring 362 is positioned between the inner clutch plate collar 366 and the spring tensioner 368 to create the bias force. The bias force is created by compression of the Belleville spring 362 between the spring tensioner 368 and the inner clutch plate collar 366. One advantage of this embodiment is that the spring tensioner 368 may be rotated about the threaded outside circumference 379 of the axle housing 364 to move the spring tensioner 368 outwardly or inwardly, and accordingly easily adjust the break-free force of the flywheel. Rotating the spring tensioner about the threaded axle housing 379 so as to move the spring tensioner 368 outwardly will increase the compression of the Belleville washer, and hence increase the break-free force. Rotating the spring tensioner 368 about the threaded axle housing 379 so as to move the spring tensioner inwardly will decrease the compression of the Belleville washer 362, and hence decrease the break-free force. The compression of the Belleville washer 362 against the inner clutch plate collar 366 causes the inner clutch plate to be biased inwardly against the inner friction material 376, which is pushed against the slave gear collar 370, which in turn is pushed against the outer clutch plate material 374 and in turn frictionally engages the outer clutch plate collar 372.

An additional advantage of this embodiment is that frictional engagement of the free wheel clutch mechanism 360 may be applied with preferably about 1.5 turns of the spring tensioner 368 about the axle housing. This provides for simple removal and unloading of the device. Additionally, as the clutch material (374, 376) wears down and becomes thinner, the compression of the Belleville washer 362 may be readily adjusted by way of rotation of the spring tensioner 368. As with other embodiments described herein, as the clutch plate material (374, 376) wears down, the Belleville washer 362 will extend and maintain the friction force on the clutch system 360. The break-free force, however, will decrease unless appropriate adjustments are made with the spring tensioner 368.

The inner clutch plate washer 376 is positioned adjacent to and in contact with the inner clutch plate 366, and the slave gear collar 370 is similar to the slave gear collars described in previous embodiments and includes a bearing 382 positioned between the slave gear collar 370 and the outer circumference of the outer clutch plate body 372, the bearing 382 being a two-way bearing allowing the slave gear collar 370 to free-wheel when turned in a reverse direction, and locking to provide a direct drive when turned in the forward direction. Preferably, an INA Bearing Company shell-type roller clutch bearing as described previously herein is used. Gear teeth are formed on the outer circumference of the slave gear collar 370 (or sprocket) for engagement with the chain of the drive train. As the slave gear collar 370 is driven in the forward direction by the drive train, the one-way bearings lock and create a direct drive relationship. When sufficient reverse drive force is applied to the slave gear collar 370 through the drive train and the break-free force is exceeded, the one-way bearings release and allow the drive train collar to free-wheel under the influence of the frictional relationship with the inner and outer clutch plates, similar to the interaction described with respect to the other embodiments herein.

In this embodiment, the clutch plate material (374, 376) is preferably a hard plastic such as Polyethylene, which has advantageous wear characteristics. Using the hard plastic as the clutch plate material, preferably 900 lb. of friction force is applied to the freewheel clutch 360 through the Belleville washer 362 using the spring tensioner 368. To adjust the friction, or break free force, the spring tensioner preferably includes a radial hole in its outside circumference in which a dowel may be inserted to rotate the spring tensioner. The friction force on the Belleville washer may range from between 0 lb. to about 1200 lb. depending on how the spring tensioner is adjusted. At the pedals, the break-free torque is preferably about 344 in.-lb. to about 444 in.-lb. The preferred specifications of the Belleville washer are: OD=55.8 mm; ID=28.6 mm; Thickness (uncompressed)=2 mm; 830 (+/−20) lb. at 75% compression; 1110 (+/−30) lb. at 100% compression; Material=SAE 1075.

Similar to the embodiment illustrated in FIG. 5a, the outer clutch plate collar 372 includes a hollow cylindrical main body 384 with internal threads at one end for engagement with the external threads on the outer end 386 of the axle housing 364. The clutch plate collar 372 defines an outer radially extending engagement flange 388 attached to the outside end of the main body, and an inner radially extending flange, which is the inner clutch plate 366, moveably attached to the inside end of the cylindrical main body 384. The inner clutch plate 366 is able to move axially (longitudinally) along all or a portion of the length of the cylinder main body 384 of the outer clutch plate collar 372. As shown with reference to the embodiments illustrated in FIGS. 7, 8, and 9, the inner flange 366 has a central bore 124 defining a plurality of radially inwardly extending keys 126. Corresponding longitudinally extending slots 128 are formed on the surface of the cylindrical main body of the outer clutch plate collar 372 at its inner end, and extend at least partially along the length of the main body, to receive keys 126 and allow the inner flange to move (float) axially along the length of the cylindrical main body 384, to the extent of the length of the slots. When the cylindrical main body 384 is threadedly connected to the axle housing 364, the inner flange 366 is positioned so the keys 126 are slidably received in the slots, and the inner flange 366 is retained on the end of the cylindrical main body 384 by the axle housing 364. The intersection of the keys in the slots make the inner flange turn with the cylindrical main body.

It is contemplated that these free wheel clutch mechanism structures described herein could be mounted on the drive sprocket of the drive train, in addition to the slave sprocket of the drive train. It is also contemplated that a one-way bearing need not be used in all circumstances, in which case the clutch mechanism would be caused to slip if the break-free force threshold was reached in either the forward or rearward drive-train direction.

Figure 32:
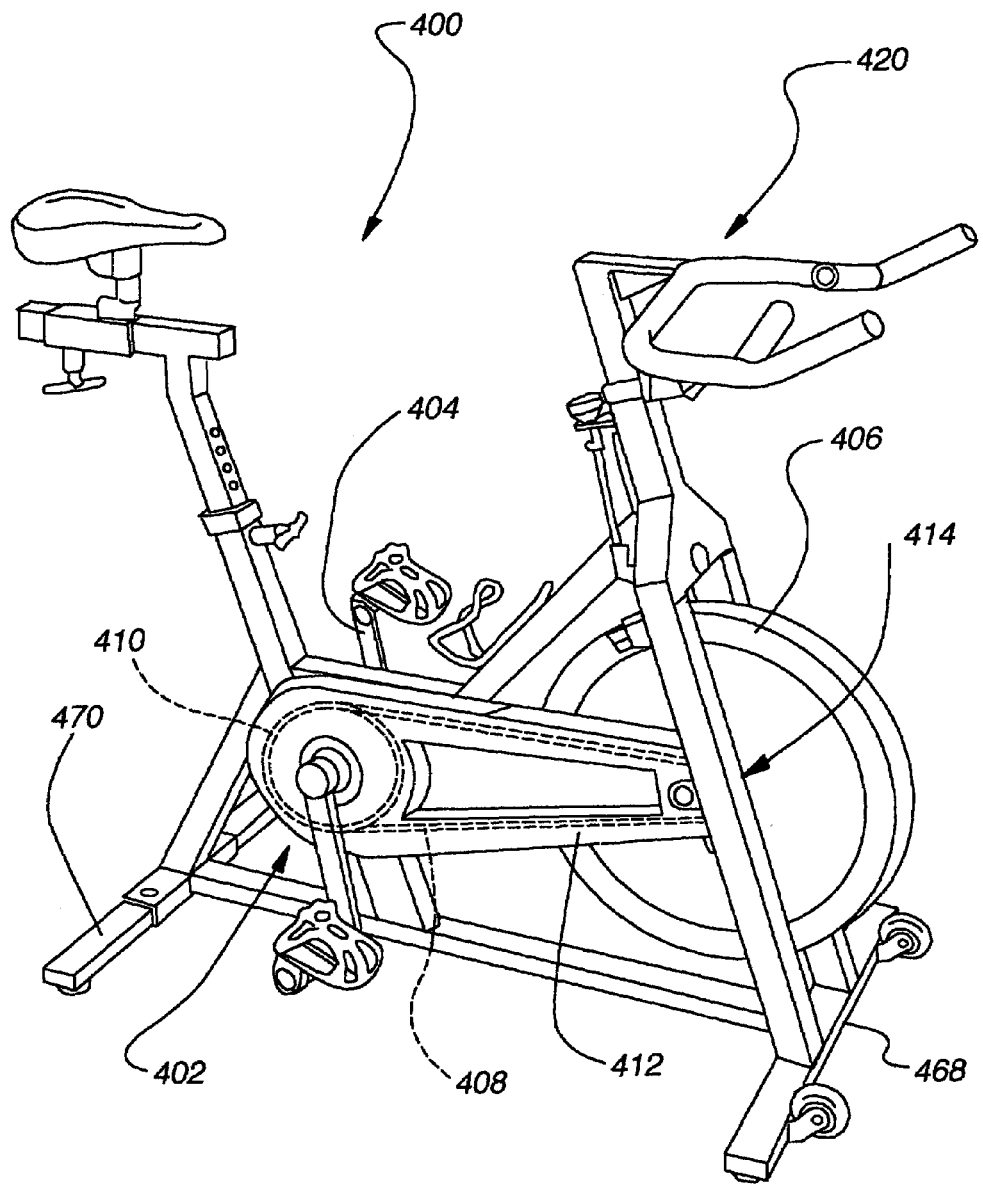
FIG. 32 is a perspective view of an exercise bicycle according to one embodiment of the invention.

FIG. 32 is a perspective view of an exercise bicycle 400 according to one embodiment of the invention. The exercise bicycle includes a drive train 402 having a pedal assembly 404 for a user to drive a flywheel 406 at the front of the bike. In one example, a protective shroud 408 helps to prevent the user from inadvertently coming in contact with portions of the drive train, such as a drive sprocket 410, a chain 412 or a belt (shown in hidden line), and the like. The flywheel and the drive train can include a clutch mechanism 414 as described above. During use, the user can peddle at varying rates, stand on the pedals, lean forward, lean backward, sit down, and generally go through a number of different movements to provide a comprehensive upper and lower body workout. Thus, the exercise bicycle 400 is designed to be strong enough to withstand such a comprehensive workout. The exercise bicycle is also designed to be strong enough to support the rapidly spinning flywheel, to withstand the rigors of numerous different users throughout a given day in a health club, and to be adjustable so that different sized users can use the exercise bicycle comfortably.

Figure 33:
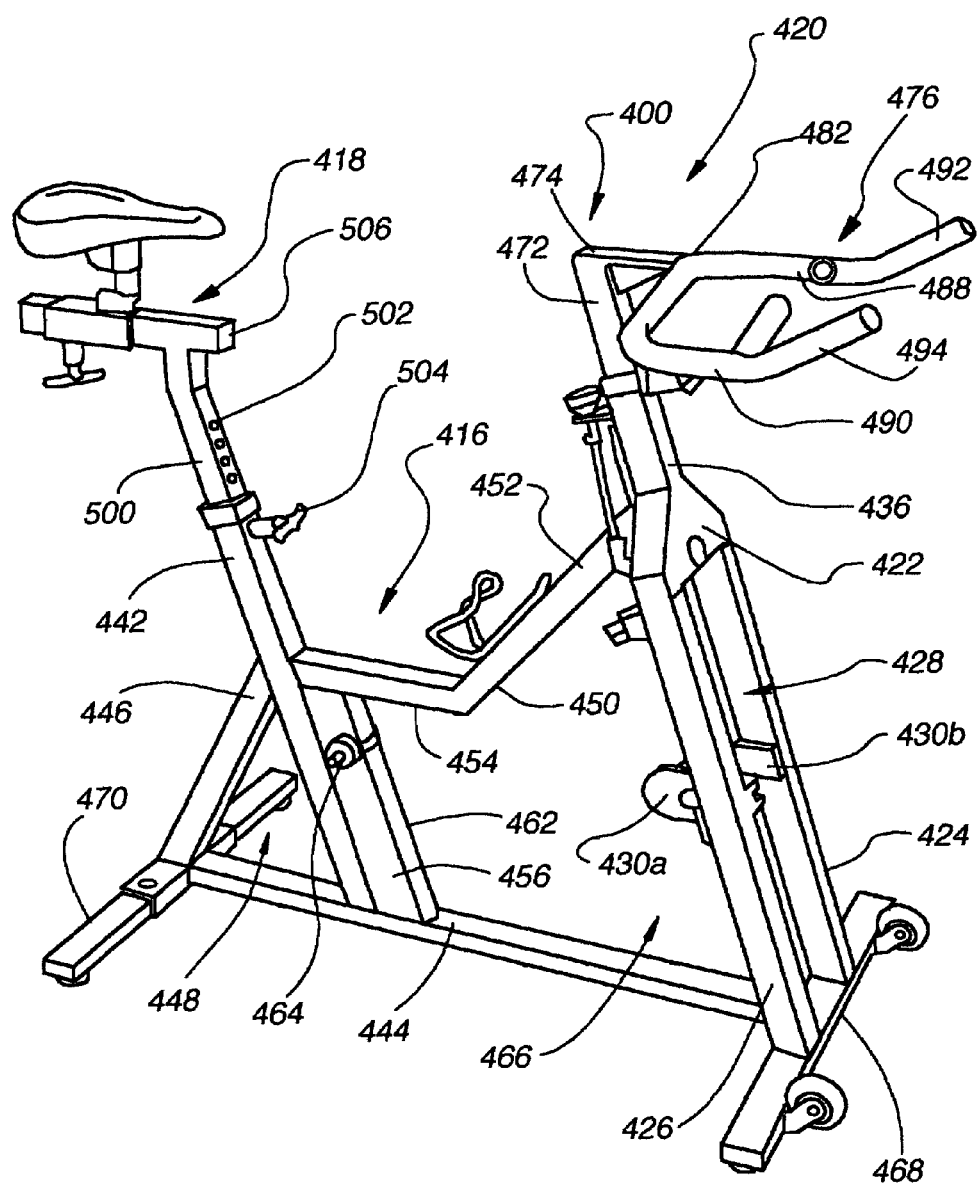
FIG. 33 is perspective view of a frame, a handlebar structure, and a seat assembly structure of the exercise bicycle of FIG. 31, according to one embodiment of the invention.
Figure 34:
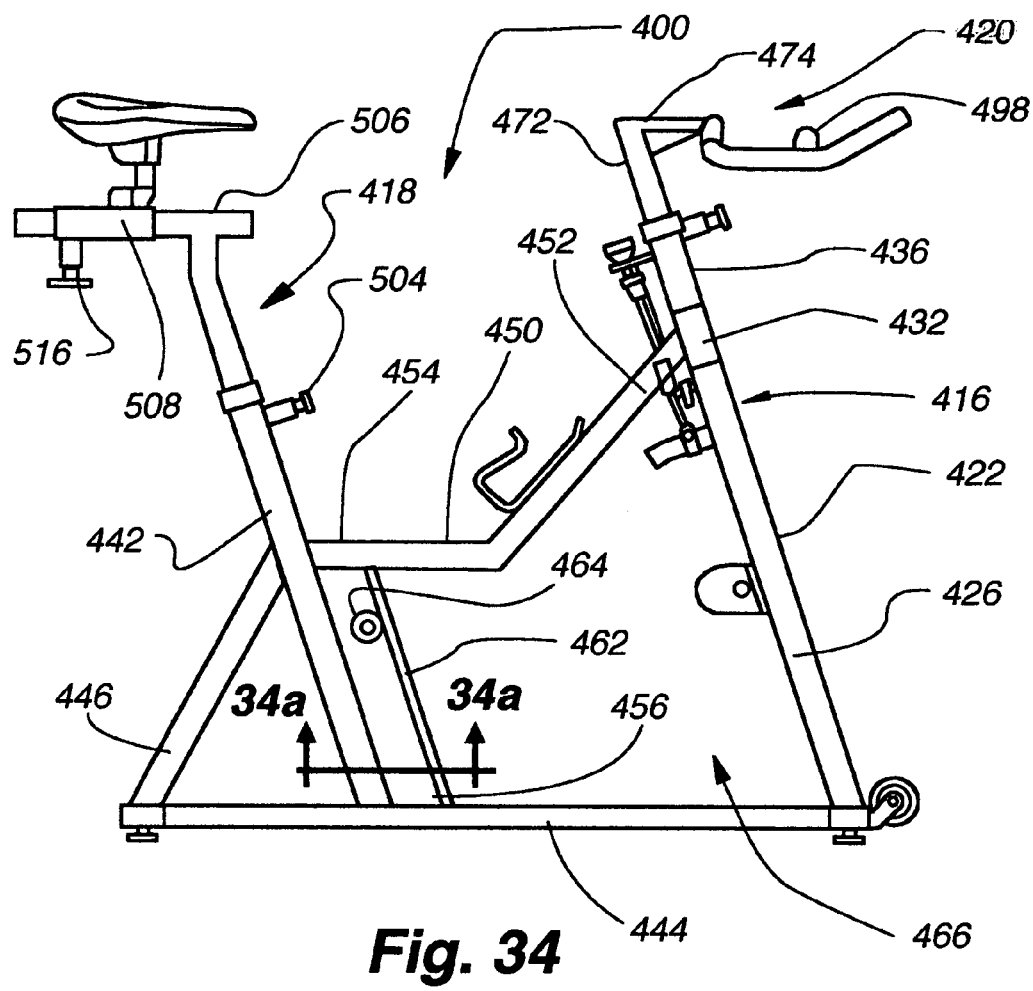
FIG. 34 is a side view of the frame, the handlebar structure, and the seat assembly illustrated in FIG. 32.

FIG. 33 illustrates a perspective view of an exercise bicycle frame 416 and FIG. 34 illustrates a side view of the exercise bicycle frame 416. The exercise bicycle includes an adjustable seat structure 418 and an adjustable handlebar structure 420, which are also illustrated in FIGS. 32 and 33 along with the frame 416. In one example, the frame extensively utilizes square or "box beam" type frame members for strength and rigidity purposes. Frame members such as are taught by U.S. Pat. No. 4,936,570 (issued Jun. 26, 1990) to Szymski et al., which is hereby incorporated by reference in its entirety, may also be used.

Figure 35:
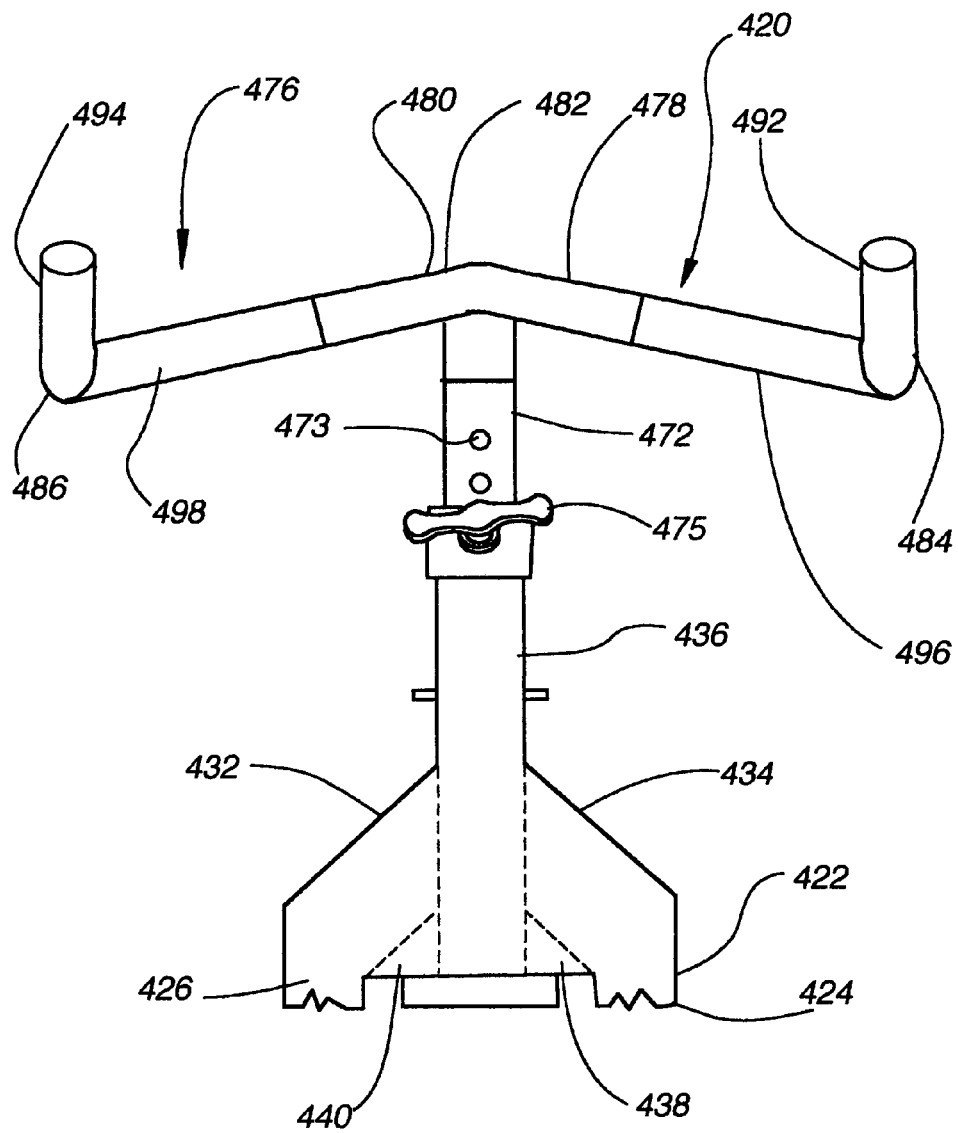
FIG. 35 is a front view of the exercise bicycle illustrating the top portion of a front fork of the frame and the handlebar structure.

The frame 416 includes a front fork 422 having a left leg 424 and a right leg 426 defining a channel 428 between the two legs where the flywheel 406 is supported. "Left" and "right" are discussed for purposes of describing FIGS. 32–39 with reference to a user sitting on the seat assembly 418 and facing the handlebar assembly 420. In one example, the left leg and the right leg are parallel to one another and rearwardly leaning. A bracket 430a, 430b is mounted on the inner portion of each leg to rotatably support the axle of the flywheel between the left leg and the right leg. Diagonal tubes 432, 434 extend inwardly and upwardly from the top of each fork leg. The diagonal tubes are welded to a box beam type head tube 436 as best depicted in FIG. 35, which is a front view of the exercise bicycle 400 illustrating the top front portion of the front fork 422 and a front view of the handlebar assembly 420. The head tube adjustably supports the handlebar assembly 420 so that a user may move the handlebar up or down to a comfortable position.

As shown by the hidden lines of FIG. 35, the head tube 436 extends downwardly past the bottom of the diagonal tubes (432, 434). A left plate 438 is welded to the bottom front of the left diagonal tube 434 and to the left outside edge of the head tube 436 below the left diagonal tube. A right plate 440 is welded to the bottom front of the right diagonal tube 432 and to the right outside edge of the head tube 436 below the right diagonal tube. The head tube extends upwardly past the diagonal sections and generally has the same rearward leaning orientation as the front fork 422. The welded connection of the head tube, the diagonal tubes, the plates, and the fork legs provide a strong structural area to support the flywheel and the handlebar, which absorbs tremendous stress during use.

Referring again to FIGS. 33 and 34, the frame 416 further includes a rearwardly leaning box beam type seat tube 442 that is generally parallel with the front fork 422 and head tube structure 436, i.e., the seat tube has the same rearward lean angle as the front fork and head tube. The seat assembly 418 is adjustably mounted in a top portion of the seat tube so that a user may move the seat up and down to a comfortable portion.

A bottom frame member 444 extends between the bottom of the front fork 422 and the bottom portion of the seat tube 442. The bottom frame member further extends rearwardly from the bottom of the seat tube. A rear support brace 446 extends from the rear of the bottom frame member to about midway up the seat tube. The rear support brace 446, the seat tube 442, and the bottom frame 444 member define a triangle 448. The rear support brace helps to support the seat tube when a user is seated, which imparts generally rearward and downward forces on the seat tube.

The frame 416 further includes a top tube 450 having a first inclined length 452 extending downwardly and rearwardly from the top of the front fork 422 and having a second horizontal length 454 extending horizontally and rearwardly from the first length 452 to the seat tube 442. The horizontal second length of the top tube is generally parallel with the bottom frame member 444. In one example, the second horizontal length of the top tube is connected to the front of the seat tube directly in line with the support brace 446 connected to the rear of the seat tube. The top tube 450 provides structural integrity and support, in part, to the frame by connecting the front fork to the seat tube. In addition, conventional exercise bicycles oftentimes use a single length top tube connected between the head tube and the seat tube. By having a second horizontal length 454, the first length of the top tube is lower and further forward than many exercise bicycles using conventional single length top tubes. Thus, the top tube of the present invention provides less interference for the user when mounting and dismounting the exercise bicycle.

Figure 34A:
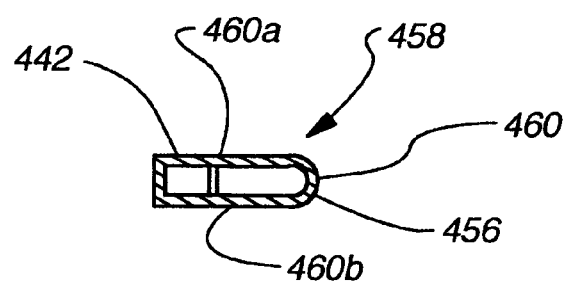
FIG. 34a is a section view taken along line 34a—34a of FIG. 34.

A substantially vertical gusset 456 having a U-shaped 458 cross-section illustrated in FIG. 34a extends between the horizontal second length 454 of the top tube and the horizontal bottom frame member 444. The walls 460a, 460b defining the open side of the U are welded to the length of the seat tube 442 from the section of the seat tube adjacent the top tube 450 to the section of the seat tube adjacent the bottom frame member 444. The front wall 460 of the gusset 456 defines the radius of the U and is substantially parallel to the seat tube. The top of the gusset is welded to the bottom of the second horizontal length 454 of the top tube adjacent the seat tube, and the bottom of the gusset is welded to the top of the bottom frame member 444 adjacent the seat tube. In one example, the side view of the gusset as best depicted in FIG. 34 defines a parallelogram. The gusset, however, may define a triangle or other shape. Moreover, the gusset may only be connected with the top tube and the seat tube, or the seat tube and the bottom frame member, or the top tube and the bottom frame member.

The gusset 456 supports a bottom bracket 464. In one example, the bottom bracket is located proximate the upper portion of the gusset and forwardly of the seat tube. The bottom bracket rotatably supports the pedal assembly 464. In addition to supporting the bottom bracket, the gusset provides structural support and rigidly to the frame 416 generally. As there are various forces placed on the frame and the pedal assembly due to the nature of the use that the exercise bicycle is put through (e.g., mounting and dismounting, standing on the pedals to pedal, alternatively sitting and standing during exercise, and changing position in both the sitting and standing position) structural integrity is very important.

The area defined by the front fork 422, the first length of the top tube 452, the second horizontal length of the top tube 454, the seat tube/gusset (442, 456), and the bottom frame member 444 defines a five-sided frame structure 466. The five-sided frame structure 466 provides structural integrity for all parts of the exercise bicycle, provides space for the flywheel, and provides minimal interference to the user when mounting and dismounting the exercise bicycle.

Lateral support for the exercise bicycle 400 is provided by a front lateral floor beam 468 and a rear lateral floor beam 470. The front floor beam is connected transversely to the bottom of the front fork 422 and to the front of the bottom frame member 444. The rear floor beam is connected transversely to the bottom of the rear support brace 446.

Figure 36:
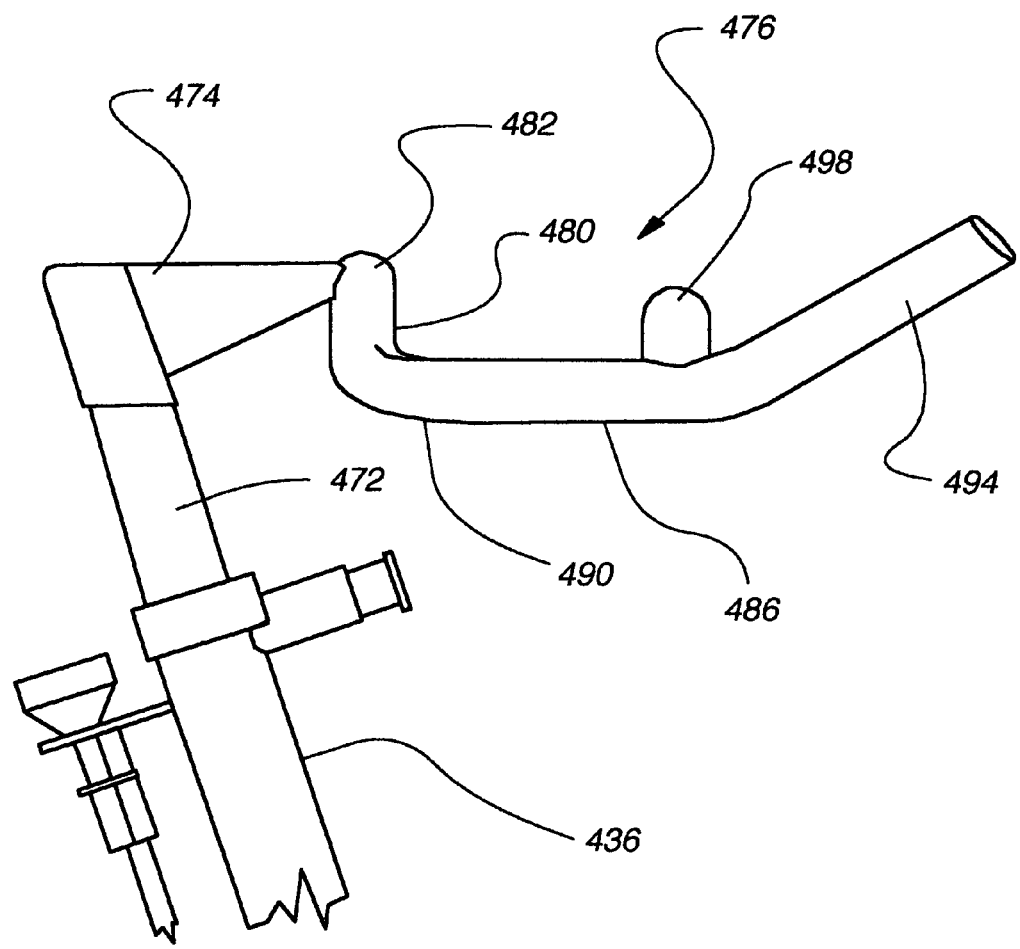
FIG. 36 is a side view of the handlebar structure, according to one embodiment of the invention.
Figure 37:
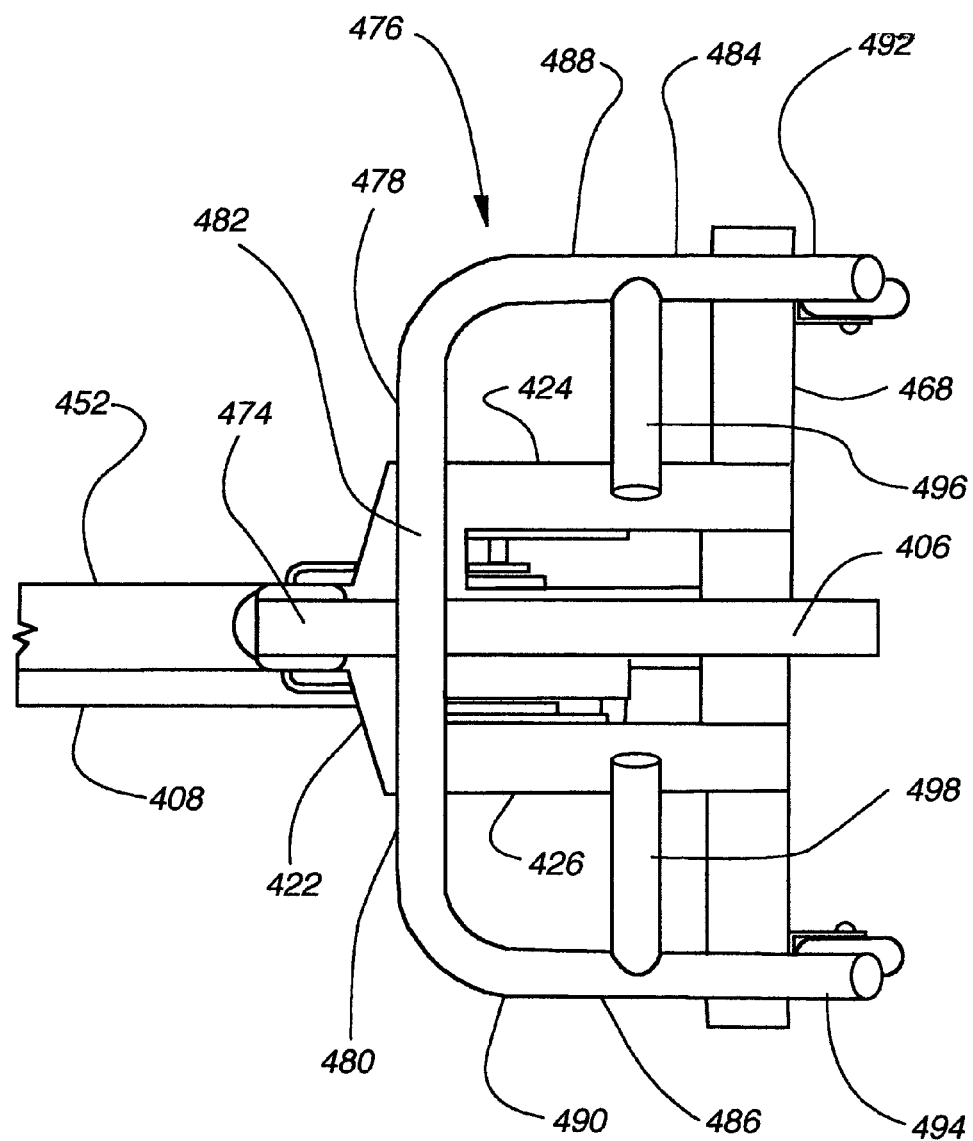
FIG. 37 is a top view of the handlebar structure, according to one embodiment of the invention.

The top of the head tube 436 and the seat tube 442 both define generally square apertures for adjustably supporting the handlebar structure 420 and the seat structure 418, respectively. Referring now to FIGS. 35, 36, and 37, a front view, a side view, and a top view of the handlebar structure 420 are shown, respectively. FIGS. 32 and 33 illustrate perspective views of the handlebar structure.

Other suitable handlebar structures for use with the present invention are described in United States Patent Application No. 29/156,767 entitled "Exercise Bicycle Handlebar", filed on Mar. 6, 2002, which is hereby incorporated by reference in its entirety.

The handlebar structure 420 includes a box beam type handlebar stem 472 adapted to be received by the head tube. In one example, the front of the stem 472 defines a plurality of apertures 473 along its front wall adapted for engagement by a first spring loaded retaining pin 475 connected with the front of the head tube 436. The first retaining pin is used to secure the stem at a particular vertical height with respect to the head tube and to thereby provide height adjustment for the handlebar structure. A support arm 474 extends forwardly from the top of the handlebar tube and when assembled with the frame is generally parallel to the bottom frame member 444.

The part of the handlebar structure adapted to be gripped by the user, i.e., a gripping portion 476, is attached to the forward end of the support arm 474. The gripping portion 476 includes left and right outwardly and downwardly extending transverse bars (478, 480) best illustrated in FIGS. 35 and 37. The transverse bars, in one example, define an inverted V-shaped bar 482 with the apex area of the inverted V connected to the support arm. A first prong or left outer grip 484 extends forwardly from the outer end of the left portion of the transverse bar, and a second prong or right outer grip 486 extends forwardly from the outer end of the right portion of the transverse bar. Each prong (484, 486) extends forwardly from its respective transverse bar (478, 480) to form two generally horizontal and parallel outer grip portions (488, 490) that terminate at forwardly and upwardly extending sections (492, 494). The handlebar provides numerous gripping alternatives. For example, the user may grip the handlebar along the transverse section on either side of the support arm, on the prong grip portions, and on the forwardly and upwardly extending ends of the prong grip portions.

The gripping portion also includes left and right inner stub grip portions (496, 498) that extend inwardly from the left and right prong grip portions 486, respectively. In addition, the stub grip portions are angled upwardly and generally parallel to the left 478 and right 480 transverse sections of the gripping portion 476 as best illustrated in FIGS. 35 and 37. In one example, the inner ends of the stub grips are spaced apart by approximately 6.5 inches. The stub grips, however, may be spaced apart by any length.

Figure 38:
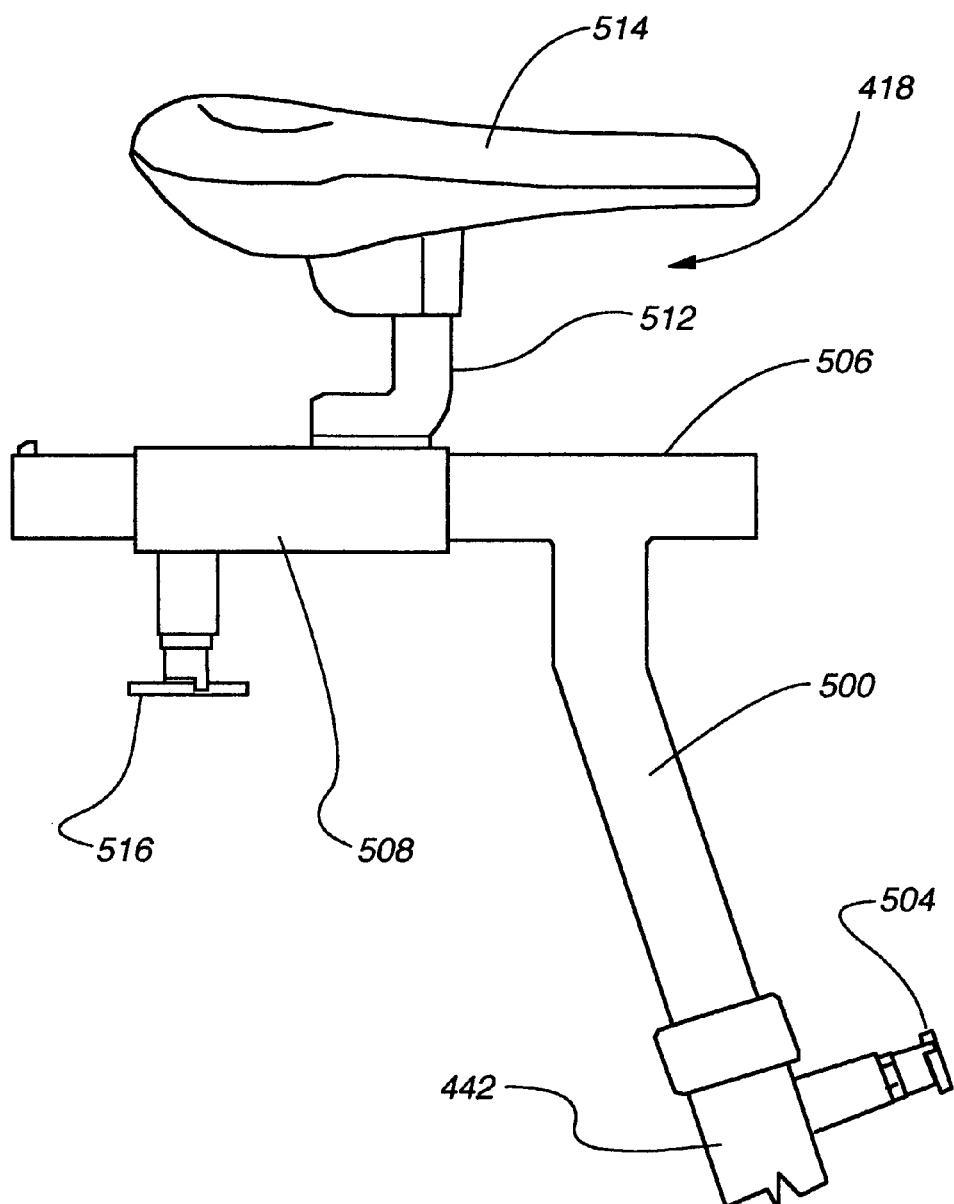
FIG. 38 is a side view of the seat assembly, according to one embodiment of the invention.
Figure 39:
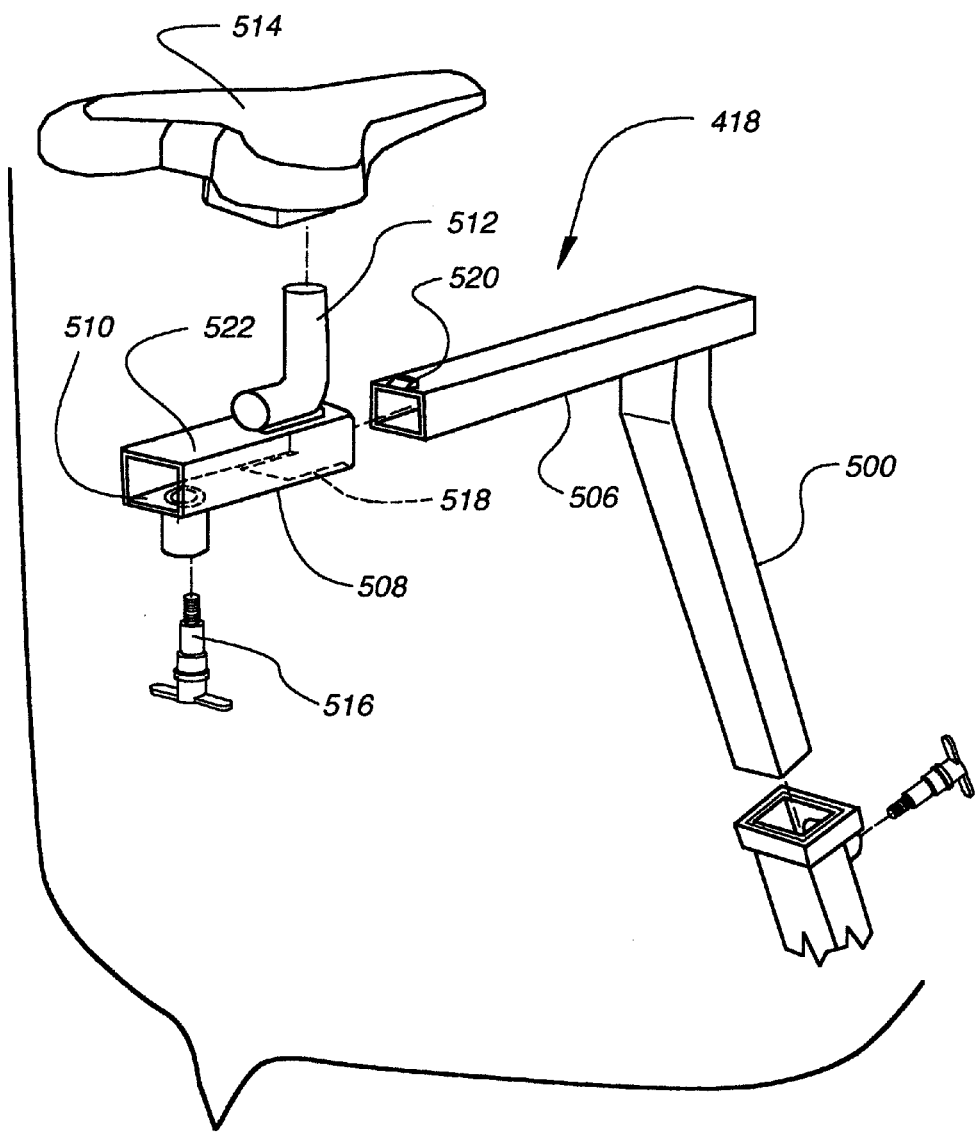
FIG. 39 is an exploded rear isometric view of the seat assembly structure, according to one embodiment of the invention.

FIGS. 38 and 39 illustrate a side view and an exploded rear perspective view of the top portion of the seat support structure 418, respectively. The seat support structure includes a square box beam type seat post 500 adapted to be received by the seat tube 442. In one example, the seat post defines a plurality of apertures 502 (shown in FIG. 33) along its length adapted for engagement by a second spring loaded retaining pin 504 connected with the front of the seat post. The second retaining pin is used for securing the seat post at a particular vertical height with respect to the seat tube and to thereby provide height adjustment for the seat assembly.

The seat support structure 418 further includes a horizontal rearwardly extending box beam type seat support rail 506 attached to the top of the seat post 500. The rail extends generally rearwardly from the seat post, and a small portion of the seat rail extends forwardly from the seat post. A seat slide collar 508 defining a square aperture 510 is adapted to slide over and around the seat rail. In one example, an L-shaped cylindrical seat post 512 is attached to the top of the seat slide collar to support the seat 514. The seat may be adjusted forwardly or rearwardly to suit a particular user. In one example, the seat slide collar includes a third spring loaded retaining pin 516 on its bottom and rearward portion, which is adapted to engage a plurality of apertures defined along the bottom side of the rail 506 to lock the seat slide in one of a plurality of fore and aft positions.

The seating position can be moved forwardly or rearwardly by adjusting the seat slide collar 508 along the length of the seat rail 506 and fixing it in a desired position using the third retaining pin 516. The forward portion of the bottom wall of the seat slide defines a channel 518 to fit around the seat post 500 so that the seat slide collar 508 can move forwardly along the seat rail 506 until the third retaining pin 516 nearly abuts the rear side of the downwardly extending seat tube. In the forward most position, the front of the seat slide is generally adjacent the forward most position of the seat rail.

The rearward portion of the top wall of the seat rail includes an upwardly extending retaining nub 520. The rearward portion of the top wall of the seat slide defines a second channel 522 adapted to fit around the nub so that the seat slide collar 508 can move rearwardly along the seat rail 506 until the forward most portion of the second channel 522 abuts the nub. In this manner, the seat slide is stopped from sliding rearwardly off the seat rail.

Various embodiments of the present invention and many of its improvements have been described with a degree of particularity. The previous description is of examples for implementing the invention, and the scope of the invention should not necessarily be limited by this description. The scope of the present invention is defined by the scope of the following claims.

We claim:

1. An exercise bicycle frame comprising:
   a front fork having a head tube and at least one fork leg;
   a seat tube having a top section and a bottom section;
   a top tube extending between the front fork and the seat tube, the top tube having a first portion angularly offset from a second portion;
   a rear support brace connected with the seat tube;
   a bottom frame member extending between the rear support brace, the seat tube, and the front fork, substantially the entire length of the bottom frame member being substantially parallel with the second portion of the top tube;
   a gusset connected with the bottom section of the seat tube, wherein the gusset includes a bottom bracket for supporting a pedal assembly, and wherein the gusset includes a first side wall and a second side wall defining a substantially U-shaped cross section; and
   wherein the front fork, the first portion of the top tube, the second portion of the top tube, the seat tube, and the bottom frame member define a five-sided frame section.

2. The exercise bicycle frame of claim 1 wherein the first side wall and the second side wall are connected with the bottom section of the seat tube.

3. The exercise bicycle frame of claim 2 wherein the first side wall and the second side wall are connected with the second portion of the top tube and the bottom frame member.

4. An exercise bicycle frame comprising:
   a five side frame structure including:
   means for supporting a seat assembly;
   means for supporting a handlebar assembly;
   a gusset having a first side wall and a second side wall, the gusset for supporting a pedal assembly, and wherein the first side wall and second side wall define a substantially U-shaped cross section, the gusset connected with the means for supporting a pedal assembly;
   upper means for attaching the means for supporting the seat assembly with the means for supporting the handlebar assembly, the upper means having a first length and a second angularly offset length; and
   lower means for attaching the means for supporting the seat assembly with the means for supporting the handlebar assembly.

5. A frame for an exercise bicycle comprising:
   a bottom frame member;
   a front support member connected with the bottom frame member;
   a seat support member connected with the bottom frame member rearwardly of the front support member;
   a rear support member connected with the seat support member and the bottom frame member;
   a top member defining a front region and a rear region, wherein the front region is connected with the front support member and the rear region is connected with the seat support member, the rear region being substantially parallel to the bottom frame member; and wherein the front support member, the front region of the top member, the rear region of the top member, the seat support member, and the bottom frame member define a first area with at least five sides.

6. The frame of claim 5 wherein the seat support member, the bottom frame member, and the rear support member define a second area with at least three sides.

7. The frame of claim 5 wherein the seat support member defines a top region offset from a bottom region.

8. The frame of claim 7 further comprising a pedal assembly support connected with the bottom region of the seat support member.

9. The frame of claim 5 further comprising a gusset connected with the seat support member.

10. The frame of claim 9 further comprising a pedal assembly support connected with the gusset.

11. The frame of claim 5 wherein the front region of the top member is angularly offset from the rear region.

12. The frame of claim 5 wherein the front support member defines a fork having a head tube and at least one front post.

13. The frame of claim 5 wherein the bottom frame member defines a first tube, the front support member defines a second tube, the top member defines a third tube, the seat support member defines a fourth tube, and the rear support member defines a fifth tube.

14. The frame of claim 13 wherein the first tube defines a first square tube, the second tube defines a second square tube, the third tube defines a third square tube, the fourth tube defines a fourth square tube, and the fifth tube defines a fifth square tube.

15. The exercise bicycle frame of claim 5 wherein the rear region of the top member is substantially horizontal.

16. The exercise bicycle frame of claim 5, wherein substantially the entire length of the bottom frame member is substantially parallel with the rear region of the top member.

17. The exercise bicycle frame of claim 7 wherein the top region of the seat support member is horizontally offset from the bottom region of the seat support member.

18. The exercise bicycle frame of claim 17 wherein the bottom region of the seat support member includes a bottom bracket for supporting a pedal assembly.

19. The exercise bicycle frame of claim 7 further including a gusset connected with the bottom region of the seat support member.

20. The exercise bicycle frame of claim 19 wherein the gusset includes a bottom bracket for supporting a pedal assembly.

21. The exercise bicycle frame of claim 20 wherein the gusset includes a first side wall and a second side wall defining a substantially U-shaped cross section.

22. The exercise bicycle frame of claim 21 wherein the first side wall and the second side wall are connected with the bottom region of the seat support member.

23. The exercise bicycle frame of claim 22 wherein the first side wall and the second side wall are connected with the rear region of the top member and the bottom frame member.

24. The exercise bicycle frame of claim 7 wherein the top region of the seat support member defines a seat aperture adapted to receive a seat assembly.

25. The exercise bicycle frame of claim 12 wherein the head tube defines a handlebar aperture adapted to receive a handlebar assembly.

26. The exercise bicycle frame of claim 12 wherein the front region of the top member is connected with the head tube.

27. The exercise bicycle frame of claim 26 wherein the front region of the top member extends downwardly and rearwardly from the head tube.

28. The exercise bicycle frame of claim 5 wherein the front support member comprises a means for connecting the bottom frame member with the front region of the top member.

29. The exercise bicycle frame of claim 5 wherein the front support member comprises a means for supporting a handle bar assembly.

30. The exercise bicycle frame of claim 5 wherein the top member comprises a means for connecting the front support member with seat support member.

31. The exercise bicycle frame of claim 5 wherein the seat support member comprises a means for connecting the bottom frame member with the rear region of the top member.

32. The exercise bicycle frame of claim 5 wherein the seat support member comprises a means for supporting a seat assembly.

33. The exercise bicycle frame of claim 5 wherein the bottom frame member comprises a means for connecting the seat support member with the front support member.

* * * * *